United States Patent
Chianura et al.

(10) Patent No.: US 12,139,385 B2
(45) Date of Patent: Nov. 12, 2024

(54) METHOD TO MOVE CONTAINERS IN A LINE FOR PROCESSING SAID CONTAINERS, AND CORRESPONDING PROCESSING LINE

(71) Applicant: I.M.A INDUSTRIA MACCHINE AUTOMATICHE S.P.A., Ozzano Dell'Emilia (IT)

(72) Inventors: Mattia Chianura, Ozzano Dell'Emilia (IT); Gabriele Gabusi, Ozzano Dell'Emilia (IT)

(73) Assignee: I.M.A INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 120 days.

(21) Appl. No.: 17/926,237

(22) PCT Filed: May 17, 2021

(86) PCT No.: PCT/IT2021/050145
§ 371 (c)(1),
(2) Date: Nov. 18, 2022

(87) PCT Pub. No.: WO2021/234746
PCT Pub. Date: Nov. 25, 2021

(65) Prior Publication Data
US 2023/0192466 A1    Jun. 22, 2023

(30) Foreign Application Priority Data

May 19, 2020 (IT) .................. 102020000011485

(51) Int. Cl.
*B67C 3/24* (2006.01)
*B65B 3/00* (2006.01)
(Continued)

(52) U.S. Cl.
CPC .............. *B67C 3/242* (2013.01); *B65B 3/003* (2013.01); *B65B 43/42* (2013.01); *B67C 3/202* (2013.01); *G01G 13/006* (2013.01); *G01G 13/14* (2013.01)

(58) Field of Classification Search
CPC ......... B67C 3/242; B67C 3/202; B65B 3/003; B65B 43/42; G01G 13/006; G01G 13/14
See application file for complete search history.

(56) References Cited

U.S. PATENT DOCUMENTS 7,836,922 B2 * 11/2010 Poole ................... B65B 1/12
                                                        141/12
8,899,245 B2 * 12/2014 Zardini ............... B08B 9/205
                                                        134/76
(Continued)

FOREIGN PATENT DOCUMENTS

DE      199 20 494       6/2000
EP      2 749 523        7/2014
(Continued)

OTHER PUBLICATIONS

International Search Report and Written Opinion corresponding to International Patent Application No. PCT/IT2021/050145, mailed Aug. 17, 2021.

*Primary Examiner* — Nicolas A Arnett
(74) *Attorney, Agent, or Firm* — MCANDREWS HELD & MALLOY, LTD

(57) ABSTRACT

Method to move containers (C) in a processing line (10) that comprises a station (11) for storing and picking up said containers (C) and a station (12) at least for filling said containers (C), said method providing, in said storage and pick-up station (11), to supply a container-holding tray (15) containing a plurality of said containers (C) disposed upended in said container-holding tray (15) with respect to their mouth (43), and subsequently to upend said containers (Continued)

(C) with the aid of upending means (20) so as to invert the orientation of said containers (C) and make them available with the side of the mouth (43) facing upward so that they can be picked up by extraction means (22).

12 Claims, 9 Drawing Sheets

(51) Int. Cl.
  *B65B 43/42* (2006.01)
  *B67C 3/20* (2006.01)
  *G01G 13/00* (2006.01)
  *G01G 13/14* (2006.01)

(56) References Cited

U.S. PATENT DOCUMENTS

| | | | | |
|---|---|---|---|---|
| 9,925,289 | B2* | 3/2018 | Trebbi | F26B 5/06 |
| 10,620,034 | B2* | 4/2020 | Poole | G01G 13/24 |
| 10,815,112 | B2* | 10/2020 | Gabusi | B65G 47/52 |
| 11,047,727 | B2* | 6/2021 | Trebbi | B65G 47/90 |
| 11,910,514 | B2* | 2/2024 | Chianura | G01G 23/00 |
| 2003/0056466 | A1* | 3/2003 | Muneyasu | B65G 47/917 |
| | | | | 141/171 |
| 2003/0102169 | A1* | 6/2003 | Balboni | B65B 3/003 |
| | | | | 141/83 |
| 2012/0043181 | A1* | 2/2012 | Cavina | B67C 3/202 |
| | | | | 198/339.1 |
| 2012/0090268 | A1* | 4/2012 | Krauss | B65B 3/003 |
| | | | | 53/281 |
| 2013/0098501 | A1* | 4/2013 | Bailey | B25J 15/0014 |
| | | | | 141/165 |
| 2015/0034207 | A1* | 2/2015 | Boira Bonhora | A61J 1/05 |
| | | | | 141/83 |
| 2018/0186481 | A1* | 7/2018 | Franke | B65B 3/006 |
| 2019/0177013 | A1* | 6/2019 | Bertolin | B65B 69/00 |
| 2021/0177700 | A1* | 6/2021 | Ribani | B65B 1/06 |
| 2022/0214208 | A1* | 7/2022 | Chianura | G01G 15/04 |
| 2022/0227566 | A1* | 7/2022 | Nau | B65B 55/08 |

FOREIGN PATENT DOCUMENTS

| | | |
|---|---|---|
| WO | 2001/088698 | 11/2001 |
| WO | 2010/127936 | 11/2010 |
| WO | 2018/011748 | 1/2018 |
| WO | 2019/087066 | 5/2019 |
| WO | 2019/243941 | 12/2019 |

* cited by examiner

METHOD TO MOVE CONTAINERS IN A LINE FOR PROCESSING SAID CONTAINERS, AND CORRESPONDING PROCESSING LINE

FIELD OF THE INVENTION

The present invention concerns a method to move containers along a processing line which can comprise a plurality of processing stations including, for example, at least one storage station, a station for filling and possibly weighing the containers, and a subsequent station for capping them. The present invention also concerns the processing line suitable to carry out the above method.

The containers are held and/or temporarily housed on suitable support means, in particular both when the containers are empty and also when they are filled with at least one product or substance.

The term product or substance means any liquid, semi-solid, gelatinous or solid composition, in which case it can be in powder or in grains, and which can be of plant and/or animal and/or chemical origin.

By way of non-restrictive example only, the method according to the present invention can be used in the fields of pharmaceuticals, cosmetics, healthcare, chemicals and/or food.

BACKGROUND OF THE INVENTION

In the industrial sector of the automated filling of containers, various apparatuses or machines are known, configured as processing lines inside which one or more containers are moved to and from one or more processing stations, advantageously located in succession. An example of these processing lines is described in the international patent application published under the publication number WO-A1-2018/011748.

The processing stations may comprise, for example, a storage station for the empty containers, one or more weighing stations, a station for filling the containers, a station for closing each container and a station for packing the filled containers, ready for delivery or for storage in a warehouse of finished products.

The containers in question can be flasks, for example bottles, or in any case containers having a similar or comparable shape and able to contain fluid products, in particular liquids, or solid and powder or gel products.

The movement of the containers between the processing stations, and possibly also inside them, is usually carried out with mechanical and motorized transport devices or apparatuses, which comprise, for example, conveyor belts, turntables or carousels, gears, chains, slides, lifters, mechanical arms, possibly robotic, and other mechanical members.

Irrespective of the type of transport devices used, it is necessary that the containers, which can be at least initially positioned in suitable seatings of a container-holding tray, are picked up by means of suitable pick-up members, individually or in groups, for the subsequent operations of filling, weighing and closing.

The containers are typically disposed upended on the container-holding tray head downward, or so that the side of the mouth is facing downward, for example resting in a respective seating of the container-holding tray. It should be noted that, usually, the container-holding tray reaches the processing line hermetically closed, for example by a film, after the containers disposed upended and contained inside it have been treated to be sanitized and/or sterilized.

After they have been upended again so as to have the mouth facing upward, the containers are then picked up to be moved to the next processing station, such as for example the filling and possible weighing station.

Correctly picking up the containers, moving them and positioning them during the various processing steps is of fundamental importance and generates problems that have not yet been solved in the state of the art.

Often the containers are reciprocally positioned in the container-holding tray according to a so-called "quincunx" spatial configuration, which provides staggered adjacent rows of containers, to optimize the occupation of the volumes.

This spatial disposition, although it allows to maximize the number of containers disposed in the container-holding tray, makes it difficult to pick them up, so that, in the state of the art, it is possible to pick up only a small number of containers at a time disposed in the same row, precisely because of the staggered disposition between the consecutive rows.

Consequently, the subsequent steps of filling, and possible weighing, and closing, the containers picked up are carried out at the same time only on a small number of containers.

This considerably increases the processing times of a given group of containers, since only a few can be moved at a time, reducing the overall productivity of the machine. Furthermore, this aspect considerably increases the number of movements, with a consequent increase in energy consumption, greater wear and greater overheating of the motorization units of the movement apparatuses involved.

There is therefore a need to perfect a method to move containers in a processing line which can overcome at least one of the disadvantages of the state of the art.

In particular, one purpose of the present invention is to perfect a method to move containers in a processing line which allows to pick up, for example from a container-holding tray, and to move a plurality of containers, in particular picked up simultaneously from several parallel and consecutive rows of said tray.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, some embodiments concern a method to move containers in a processing line which comprises a station for storing and picking up the containers and a station at least for filling and possibly weighing the containers.

According to one embodiment, the method as above provides, in the storage and pick-up station as above, to supply a container-holding tray containing a plurality of containers disposed resting in an orderly manner, according to a pattern defined by a positioning matrix, on the container-holding tray with their mouth facing toward a bottom wall of the container-holding tray.

The method also comprises upending the containers as above disposed in the container-holding tray by means of upending means comprising an upending tray configured to couple with the container-holding tray, so as to engage, according to the same pattern defined by the positioning matrix, at least one part of the containers. The upended containers are therefore supported at the bottom by the upending tray.

According to some embodiments, the method also comprises moving, with respect to the upending tray, extraction means in order to pick up, from the upending tray, at least two containers disposed on two parallel and consecutive rows of the positioning matrix.

The extraction means are moved in a pick-up direction on a substantially horizontal plane, so that the extraction means first encounter the first container to be picked up and then the second container to be picked up, which is therefore further downstream, when the extraction means move toward the container-holding tray in the pick-up direction.

By way of a non-limiting example, of the at least two containers that are picked up, a first container is positioned in a first row and a second container is positioned in a second row, wherein the first row is more external, in the positioning matrix as above, compared to the second row, with reference to the pick-up direction as above.

According to some embodiments, the method also comprises, after the step of moving the extraction means as above, moving the two containers picked up by means of the extraction means toward the at least filling station.

This method advantageously allows to move at once a greater number of containers than those that can be moved with the methods of the state of the art, thus allowing to reduce the number of movements involved, as well as the overall movement times, and increase productivity.

In particular, it is advantageous to reduce the number of movements since this entails, in addition to a reduction in operating times, also lower energy consumption, less wear and less overheating of the motorization units of the movement apparatuses involved. This is all the more advantageous, for example, in the event the movements are carried out by means of automated or robotic apparatuses.

According to another aspect of the present invention, there is provided a line to process containers comprising a station for storing and picking up containers and a station at least for filling and possibly for weighing the containers. This storage and pick-up station is provided with a container-holding tray on which a plurality of containers are able to be pre-positioned, according to a pattern defined by a positioning matrix, and with the side of the mouth facing a bottom wall of the container-holding tray. The storage and pick-up station is also provided with upending means comprising an upending tray and configured to upend at least part of the containers disposed in the container-holding tray, keeping them supported at the bottom by the upending tray according to the pattern defined by the positioning matrix.

The processing line as above comprises extraction means configured reciprocally mobile with respect to the upending tray as above in a pick-up direction which lies on a substantially horizontal plane.

According to one embodiment, the extraction means as above are conformed to pick up, from the upending tray, at least two containers disposed on two parallel and consecutive rows of the positioning matrix. Of these containers that are picked up, a first container is positioned in a first row and a second container is positioned in a second row, wherein the first row is upstream of the second row, with respect to a movement toward the container-holding tray in the pick-up direction, and to move the at least two containers as above toward the at least filling station after they have been picked up by the extraction means.

According to one embodiment, the pick-up direction as above is transverse to a respective row of containers of the positioning matrix.

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the possible embodiments of the invention, of which one or more examples are shown in the attached drawings. Each example is supplied by way of illustration of the invention and shall not be understood as a limitation thereof. For example, one or more characteristics shown or described insomuch as they are part of one embodiment can be varied or adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
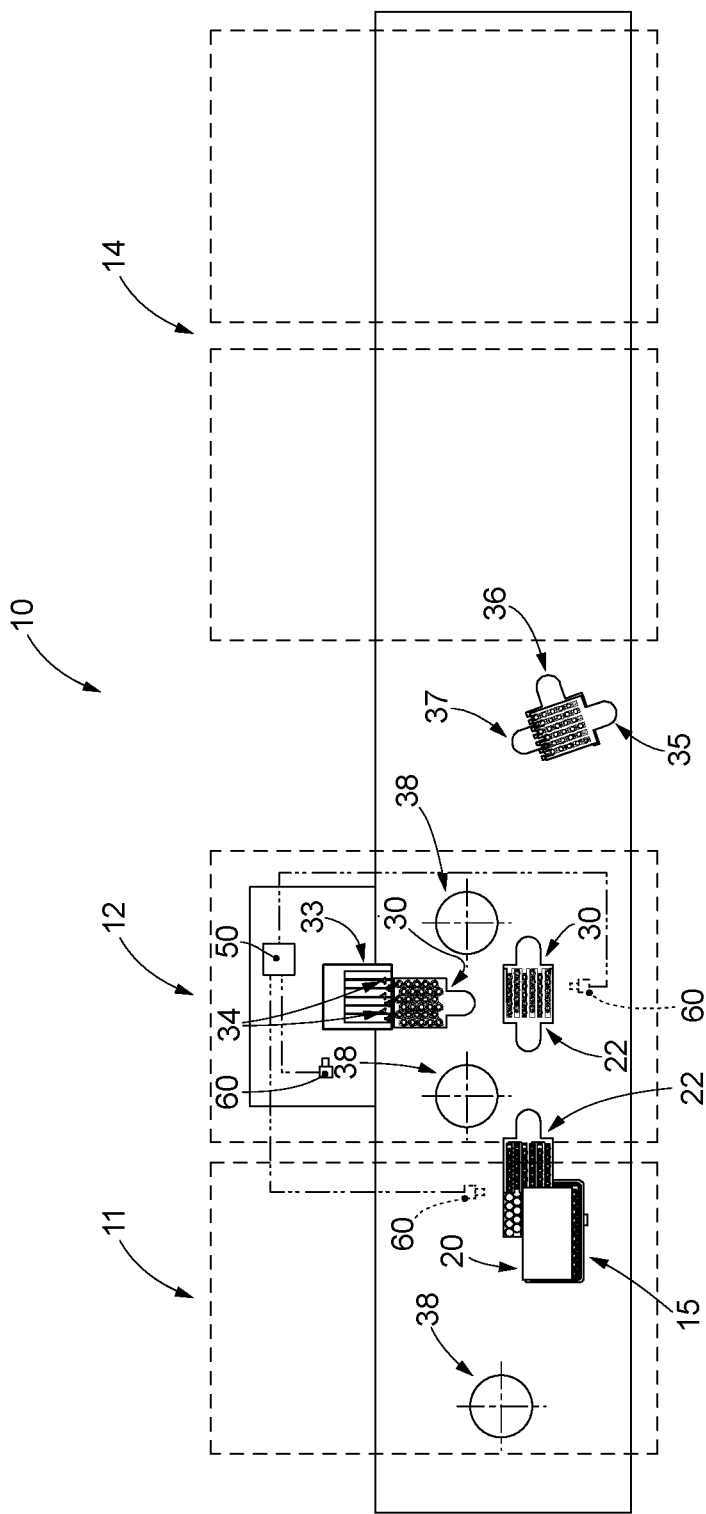
FIG. 1 is a schematic top view of a line to process containers where the method to move containers in accordance with some embodiments described here is performed at least between a station for storing and picking the containers and a station for filling and weighing the containers.

The embodiments described here using the attached drawings concern a method to move containers C in a line 10 to process containers C, and a line 10 to process containers C which comprises at least one station 11 for storing and picking up the containers C and at least one station 12 for filling and possibly weighing the containers C, FIG. 1.

Here and in the present description, the filling and possible weighing station 12 can be understood as a filling only station, or a filling and weighing station, of which the weighing can be carried out both before (tare) and also after the filling (gross weight), or only after the filling. In any case, the purpose of the weighing is to detect the net weight of the product which is metered into each of the containers C; typically, knowing the tare weight, for example of the single container C or of a group of containers C, it is possible to detect the gross weight, once the product has been metered into the same container C, and from here calculate the net weight of metered product by difference.

Furthermore, in the event the station 12 is a filling and weighing station, this expression can contemplate both the case in which the filling and weighing station is equipped with weighing means and filling means disposed in direct cooperation and proximity with each other, and also the case in which the filling and weighing station provides two zones, or sub-stations, distanced, separated or disposed far away from each other, of which a first one is provided with weighing means for weighing the tare of the containers C and a second one is provided with filling means and weighing means, for filling and weighing the quantity of product metered into each of the containers C.

Figure 10:
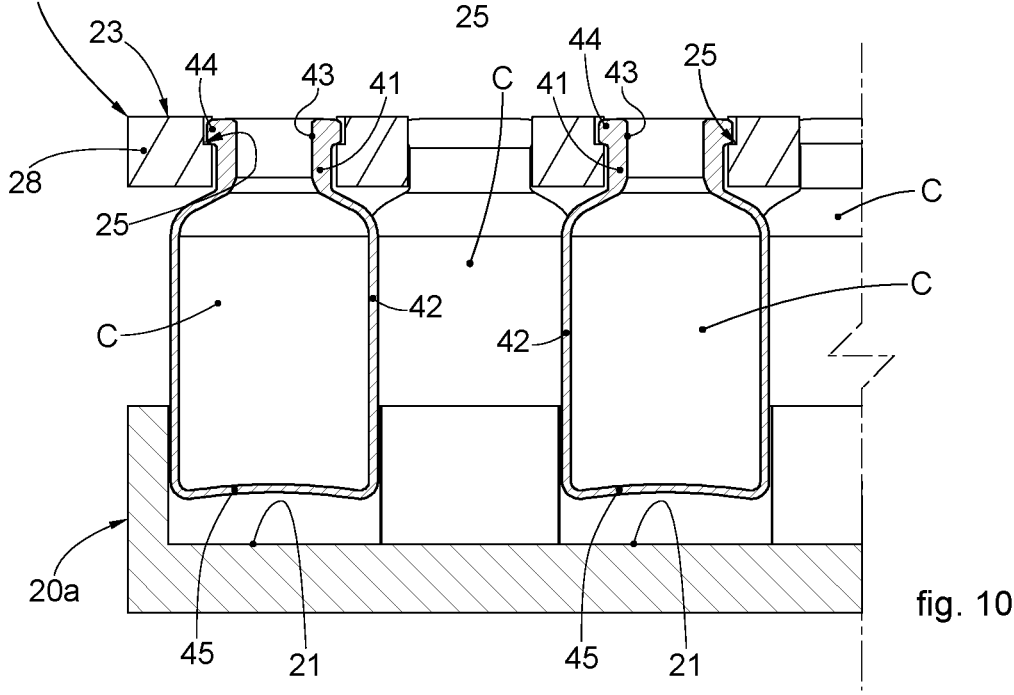
FIG. 10 is a section along line X-X of FIG. 9.

In accordance with some embodiments described here, we will refer, by way of a non-limiting example, to the type of container C better visible for example in FIG. 10, where the container C is configured as a flask or bottle able to contain fluid products, in particular liquids, or solid and powder or gel products. In these possible embodiments, the container C has a neck 41 that projects from a containing body 42, and a mouth 43. The neck 41 has at the upper part, in correspondence with the mouth 43, a protruding annular edge 44, while in an opposite position there is a bottom end 45. It is evident that the containers C can also have other shapes and sizes, possibly even not similar or comparable to that of a flask or bottle.

Figure 2:
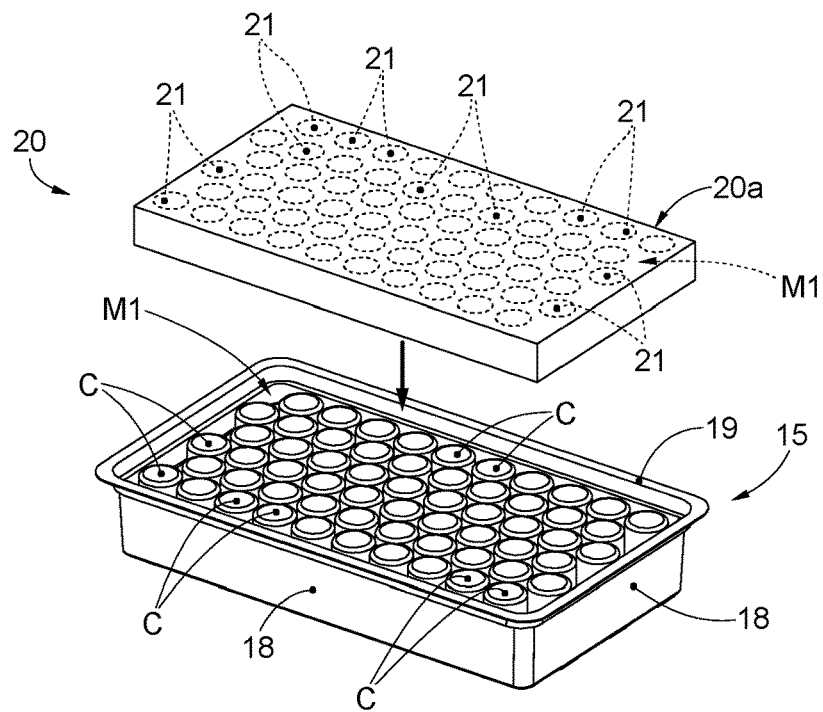
FIG. 2 is a perspective view that shows the supply of the container-holding tray provided with containers and the cooperation with upending means inside the storage and pick-up station.
Figure 3:
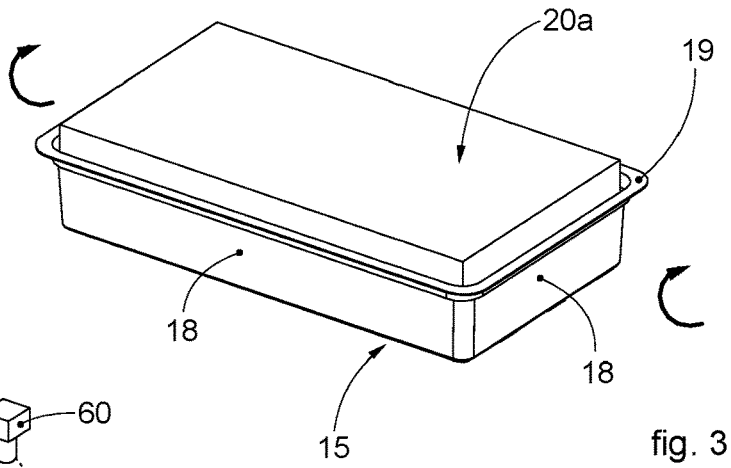
FIG. 3 is a perspective view that shows the upending of the containers inside the storage and pick-up station.

In accordance with some embodiments, the storage and pick-up station 11 comprises, or is associated with, at least one container-holding tray 15. The container-holding tray 15 has a bottom wall 17. On the container-holding tray 15 there are pre-positioned a determinate number of empty containers C so as to form an ordered group of containers C according to a positioning matrix M1, FIG. 2. The positioning matrix M1 is defined for example by a disposition according to a pattern of lines and columns of the containers C in the container-holding tray 15. Here and in the present description, in order to identify lines or columns of the containers C we may also use the term "row" (see for example rows I, II in FIGS. 4 and 9), where by row we mean a succession of elements aligned with each other, in this specific case containers C. This pattern can for example provide that the containers C of one row are offset with respect to those of the two adjacent rows, that is, that one element of one row is disposed in the space between two elements of a subsequent or previous row, so as to optimize the spatial disposition and ensure that the container-holding tray 15 is able to accommodate the highest possible number of containers C. This spatial disposition of containers C, typical of this sector, is also called, in jargon, a "quincunx" disposition.

The container-holding tray 15 is provided with a plurality of support seatings 16 (see FIGS. 5-7); these support seatings 16 suitably reproduce the pattern of the positioning matrix M1. The support seatings 16, for example, can be defined by elements projecting from the bottom wall 17, or they can be disposed, or made, on the bottom wall 17 of the container-holding tray 15 according to a determinate spatial configuration, for example a "quincunx" disposition. The containers C are positioned upended in the support seatings 16 with the side of the mouth 43 facing downward, that is, toward the bottom wall 17, in particular for example resting on the bottom wall 17, FIG. 5.

Each container C is initially upended, for example resting in a respective support seating 16. In the example embodiments described here, each support seating 16 has a closed bottom, defined by a portion of the bottom wall 17.

The support seating 16 can be made hollow in the bottom wall 17 or it can be delimited laterally by a perimeter bead that defines the shape of the support seating 16 and can be more or less projecting from the bottom wall 17 to allow the correct positioning of the container C.

In the example described here, the support seatings 16 are able to determine a precise and defined space where the containers C can rest, but preferably have no lateral support function for the containers C whatsoever. For example, in the "quincunx" disposition, although the containers C are not positioned in contact, they are very close to each other, self-supporting each other in case of collisions.

The container-holding tray 15 can be advantageously provided with a plurality of contiguous lateral walls 18, so as to define a closed perimeter, and connected at the lower part to the bottom wall 17. The lateral walls 18 surround the containers C containing them in a lateral direction. Although in the attached drawings the lateral walls 18 are represented defining a quadrangular shape, for example rectangular, this conformation is provided by way of a non-limiting example, since the perimeter delimited by the lateral walls 18 can also have another different conformation, according to requirements.

The container-holding tray 15 can be provided with a perimeter frame 19 connected to the lateral walls 18 and configured, for example, to facilitate grinning and manipulation of the container-holding tray 15. For this purpose, the perimeter frame 19 can have a fret shaped, or stepped, profile that diverges from the lateral walls 18 toward the outside and ends with a substantially flat profile. The perimeter frame 19 can be configured to accommodate a closing film (not shown), which adheres to it, in order to hermetically close the container-holding tray 15.

In some embodiments, the storage and pick-up station 11 comprises upending means 20 comprising an upending tray 20a configured to couple with the container-holding tray 15. The upending means 20 can also comprise a specific movement mean 38, suitable to move the upending tray 20a as needed, as explained below. The upending means 20 are configured to upend at least part of the containers C disposed in the container-holding tray 15, keeping them supported at the bottom by the upending tray 20a, even after the upending, according to the pattern defined by the positioning matrix M1. In particular, the upending tray 20a is configured to engage a part, or all, of the containers C disposed in the container-holding tray 15, cooperating with the latter to invert the spatial orientation of the containers C, so that the containers C are supported by the upending tray 20a with the side of the mouth 43 facing upward.

According to some embodiments, with particular reference to the attached drawings, the upending tray 20a is for example configured as an upending plate and is provided with a plurality of upending seatings 21 reciprocally disposed according to the configuration defined by the positioning matrix M1 and configured to receive and support respective containers C with respect to the bottom end 45 thereof.

The upending seatings 21 can be made in the thickness of the upending tray 20a and have a depth such as to advantageously allow the lateral support of the containers C when they are positioned in the upending seatings 21. In the example described here, the upending seatings 21 have a circular section in accordance with a substantially cylindrical shape of the containers C. The upending seating 21 can have a slightly larger transverse size than the transverse size of the container C so as to allow its positioning to be stable, but with some play to facilitate its subsequent pick-up.

The processing line 10 also comprises extraction means 22 configured to engage at least a part of the containers C disposed on the upending tray 20a.

Figure 4:
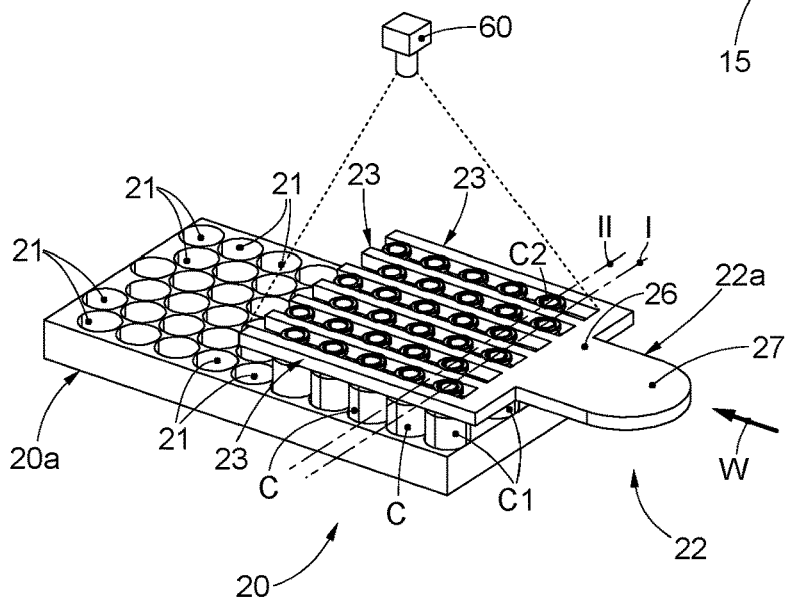
FIG. 4 is a perspective view that shows the pick-up of the containers, disposed on an upending tray, with the extraction means inside the storage and pick-up station.
Figure 9:
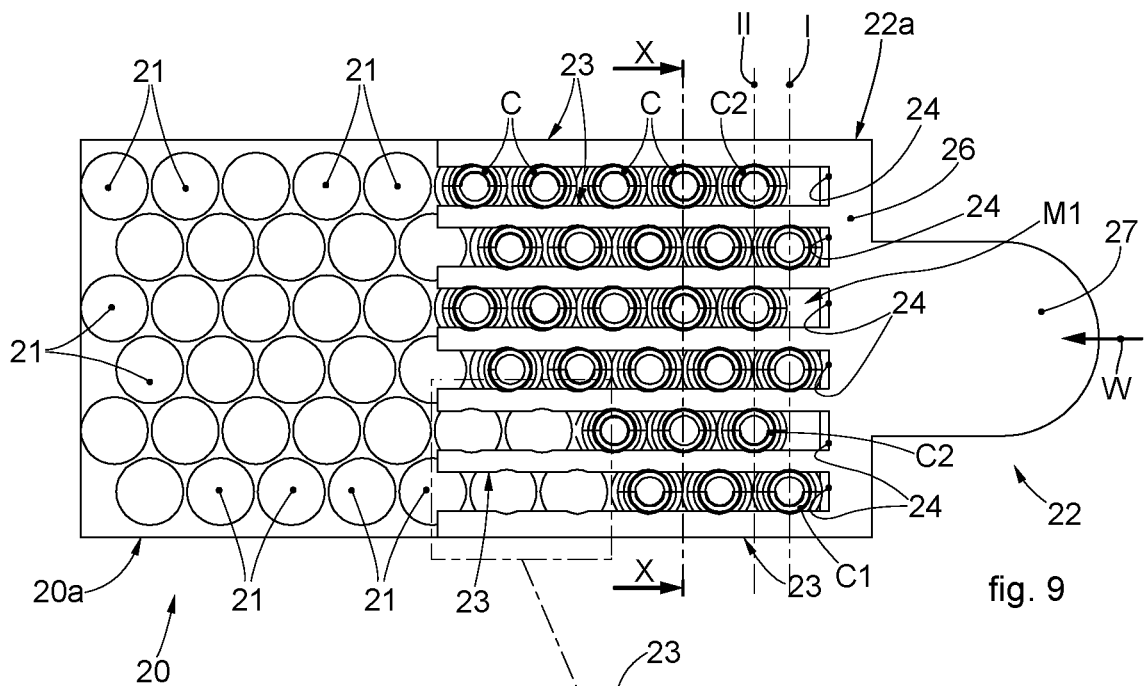
FIG. 9 is a top plan view of an extraction gripper which supports, by way of example, a plurality of containers.

The extraction means 22 are configured reciprocally mobile with respect to the upending tray 20a in a pick-up direction W (FIGS. 4 and 9). According to possible embodiments, this pick-up direction W can be, in particular, transverse, more particularly orthogonal, to a respective row of containers C of the positioning matrix M1. In this specific case, the pick-up direction W can be transverse, more particularly orthogonal, to the perimeter of the upending tray 20a defined by the respective lateral walls.

In some embodiments, the extraction means 22 are conformed to pick up, from the upending tray 20a, at least two containers C disposed on two parallel and consecutive rows I, II of the positioning matrix M1, of which a first container C1 is positioned in a first row I and a second container C2 is positioned in a second row II. The first row I is more external, in the positioning matrix M1, with respect to the second row II, referring to the pick-up direction W (see for example FIGS. 4 and 9).

According to some embodiments, the extraction means 22 comprise, or are configured as, an extraction gripper 22a provided with a plurality of inter-spaced arms, or prongs, 23 parallel to each other and defining gripping inlets 24, favorably with an elongated longitudinal shape, FIG. 9.

The extraction means 22 can comprise, or be associated with, a specific one of the movement means 38, suitable to move the extraction gripper 22a according to requirements, as explained below.

Each gripping inlet 24 of the extraction gripper 22 is configured to accommodate a plurality of containers C of the ordered group of containers C.

According to possible embodiments, the extraction means 22 are configured to perform at least a first relative movement of engagement with respect to the upending tray 20a on a substantially horizontal plane, in order to engage the at least one part of the group of containers C disposed in the upending seatings 21 of the upending tray 20a, holding the containers C engaged in the gripping inlets 24 of the extraction gripper 22. In particular, the extraction means 22 are configured to pick up containers C from at least two parallel and consecutive rows I, II of containers C. Alternatively, it is not excluded that the first relative movement as above is achieved by moving the upending tray 20a with respect to the extraction gripper 22a.

Preferably, the extraction gripper 22a, thanks to its conformation, simultaneously picks up more than one container C, in particular more than two, even more particularly more than three or more, being able to pick up even all the containers C, of one row I and also more than one container C, in particular more than two, even more in particular more than three or more, being able to pick up even all the containers C, of one row II parallel and consecutive to the row I, in order to reduce the processing and movement times, as well as the number of movements. Although here we describe the pick-up from two rows I, II, it is clear that the present invention can be applied in order to pick up containers C even from more than two rows, for example three, four, five, six or even more than six, and even from all the rows of the upending tray 20a.

The extraction gripper 22a is configured to also perform at least a second relative movement with respect to the upending tray 20a so as to extract the containers C positioned in the upending seatings 21 from the upending tray 20a, in order to move them to the next processing station, in this specific case to the filling and possible weighing station 12. In possible implementations, for this purpose the extraction gripper 22a can be moved with a lifting movement, or alternatively the extraction gripper 22a can be kept stationary and the upending tray 20a can be moved, in particular with a downward movement.

As described above, the extraction gripper 22a can be moved by means of movement means or devices 38 associated with it, which allow both a relative movement of it with respect to the containers C to be engaged and picked up, in the event that the extraction gripper 22a is moved with respect to the upending tray 20a, and also a movement in space in order to reach the filling and possible weighing station 12 of the containers C.

In accordance with some embodiments, at least in the first relative movement of engagement, the extraction gripper 22a is configured to be operationally aligned with respect to the rows, lines or columns, of the positioning matrix M1 of the upending tray 20a so that the gripping inlets 24 at least partly accommodate respective rows of containers C which are inserted in the gripping inlets 24, as shown in FIG. 9.

Figure 9A:
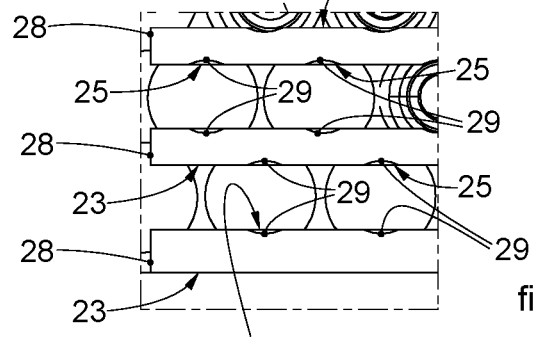
FIG. 9a shows an enlarged detail of FIG. 9.

In accordance with some embodiments, each arm 23 comprises an array of holding seatings 25 for the containers C disposed in a manner corresponding to the positioning matrix M1, each holding seating 25 being shaped to support a respective container C, FIG. 9a.

In accordance with some embodiments, the extraction gripper 22a comprises a transverse support 26 from which there depart, in a direction substantially orthogonal to the transverse support 26, on one side the arms 23 and on the other side a gripping portion, or handle, 27 by means of which the extraction gripper 22a can be manipulated, for example by an automated or robotic movement device.

In accordance with some embodiments, each gripping inlet 24 is defined between two adjacent arms 23 and can be substantially U-shaped, favorably elongated.

In accordance with possible embodiments, each arm 23 has an engagement end 28 which can advantageously be flared or with a lead-in shape, so as to facilitate the alignment and centering of the containers C to be engaged.

According to some embodiments described here, the containers C, when engaged by the arms 23 of the extraction gripper 22a, are held according to a mechanical coupling with play.

In accordance with some embodiments, shown in FIG. 9a, each holding seating 25 comprises respective support portions 29, facing each other from opposite sides of a same gripping inlet 24, the support portions 29 being made hollow on respective arms 23 in order to receive, resting on them, a respective container C, as shown in FIG. 10. In particular, the support portions 29, during use, are able to support a neck portion 41, in this specific case the protruding annular edge 44 of the container C (FIG. 10).

Each support portion 29 can have the shape of a circular segment, or of a portion of a polygon—for example of an octagon, a hexagon, a square or other polygon—or it can be defined by a surface subtended by a curve.

In accordance with some embodiments, the filling and possible weighing station 12 can comprise, or be associated in cooperation with, support means, in particular a support plate 30, configured to receive the containers C from the extraction means 22, in this specific case from the extraction gripper 22a, and to support the containers C at least during the filling and possible weighing operation.

Furthermore, the filling and possible weighing station 12 can comprise filling means 40 (which, for ease of representation, can be seen only in FIGS. 12, 15 and 16), for example nozzles or similar delivery/metering means, configured to fill each of the containers C with metered quantities.

Figure 12:
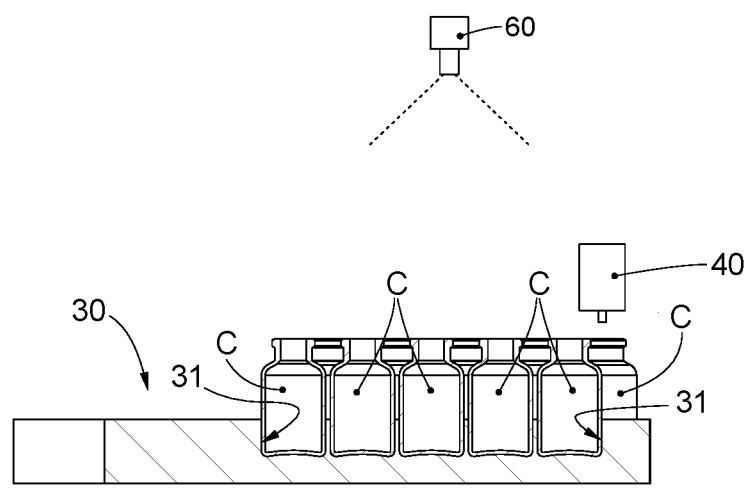
FIG. 12 is a schematic section representation of a support plate according to some embodiments described here on which containers are positioned, in cooperation with filling means of the processing line.

For example, FIG. 12 shows some embodiments in which the support plate 30 positions containers C with respect to filling means 40.

In some embodiments, the filling and possible weighing station 12 can be a filling and weighing station and, for this purpose, comprise weighing means 33. In this case, the support means can also be used to support the containers C during the weighing operation carried out by the weighing means 33 present therein.

Figure 15:
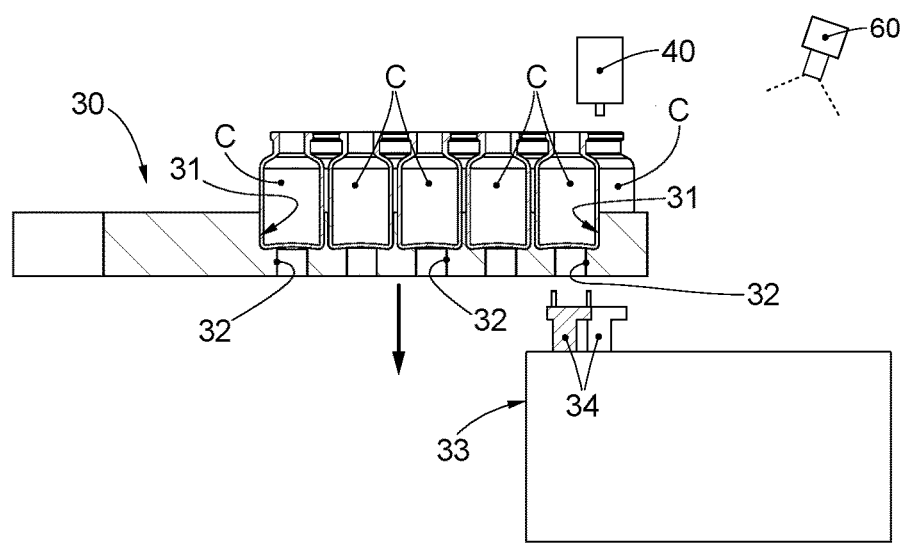
FIG. 15 is a section along plane XV-XV of FIG. 14, where filling means of the processing line have been added.
Figure 16:
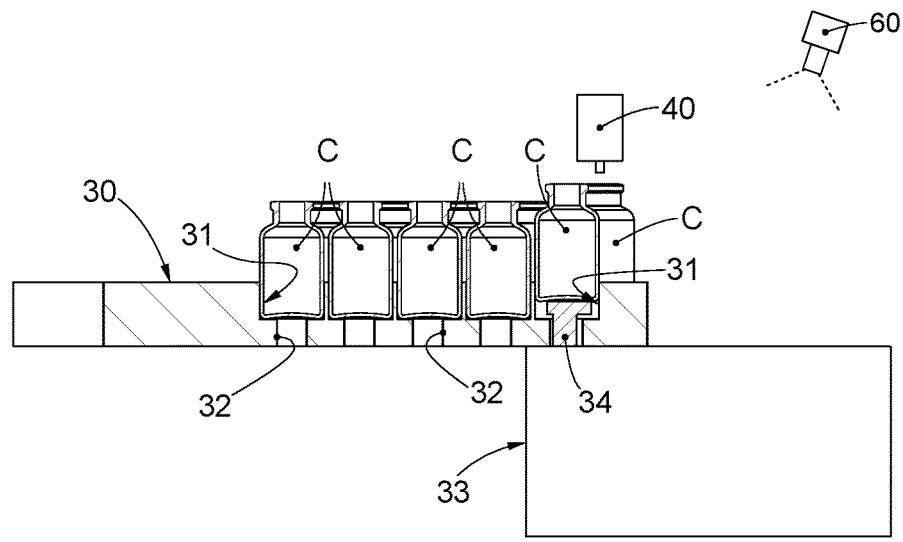
FIG. 16 represents the support plate of FIG. 15 in a different operating position.

Therefore, FIGS. 15 and 16 show some embodiments which provide the weighing, wherein the support plate 30 positions containers C with respect to filling means 40 and also with respect to weighing means 33. Alternatively, for this purpose it is also possible to directly use the extraction means 22.

In both cases, in particular when the weighing is also provided, the advantage of being able to move a plurality of containers C is evident, picked up from the container-holding tray 15, after suitable upending in the upending tray 20a, by the extraction means 22, which are advantageously provided with the extraction gripper 22a, and moved by means of the support plate 30 or the extraction means 22 themselves, the containers C then being subjected to filling and weighing by means of the weighing means 33 described here.

In some embodiments that provide the weighing, the containers C can be weighed first when they are empty (tare) and subsequently when they are full (gross weight). Alternatively, they can also be weighed only when full, that is, after filling.

It should be noted that the weighing operations, possibly before the filling and after the filling, can also be carried out in specific operating units different from each other and also from the filling unit, separated and possibly correlated by means of suitable movement means, for example by moving the extraction gripper 22a itself or the support plate 30, if provided. For example, in the event of a filling unit that is distinct and separate from a weighing unit, upstream and/or downstream, or also in other cases where required, there may be the need to align, at the filling unit, the containers C to be filled, supplied by the extraction gripper 22a, with respect to an array of filling means 40 aligned according to a given direction.

Furthermore, possibly, it is possible to provide a weighing station dedicated to measuring the weight of the empty containers C and another weighing station dedicated to measuring the weight of the containers C filled with a product or substance. Also in these embodiments, the support plate 30, or the extraction gripper 22a, can be used to move and position the containers C.

According to embodiments in which the support means are configured as a support plate 30, the latter is provided with a plurality of support seatings 31 reciprocally disposed according to the configuration defined by the positioning matrix M1, in order to receive the group of containers C moved by the extraction gripper 22a.

In particular, in this case the extraction gripper 22a carries out a first movement of alignment with respect to the support plate 30 so as to vertically align the containers C with the underlying support seatings 31 with respect to the positioning matrix M1. Furthermore, the extraction gripper 22a is configured to also perform a second movement, so that the containers C are inserted into the support seatings 31 (FIG. 11), and then retract so as to disengage the containers C which therefore remain accommodated by the support seatings 31 of the support plate 30. Alternatively, it is also possible for the support plate 30 to be moved with respect to the extraction gripper 22a.

The support seatings 31 can be made in the thickness of the support plate 30 and have a depth such as to allow the lateral support of the containers C when they are positioned therein. In the example described here, the support seatings 31 have a circular section in accordance with a substantially cylindrical shape of the containers C. The support seating 31 can have a transverse size slightly larger than the transverse size of the container C, so as to allow its positioning to be stable, but with some play to facilitate its subsequent pick-up.

Figure 13:
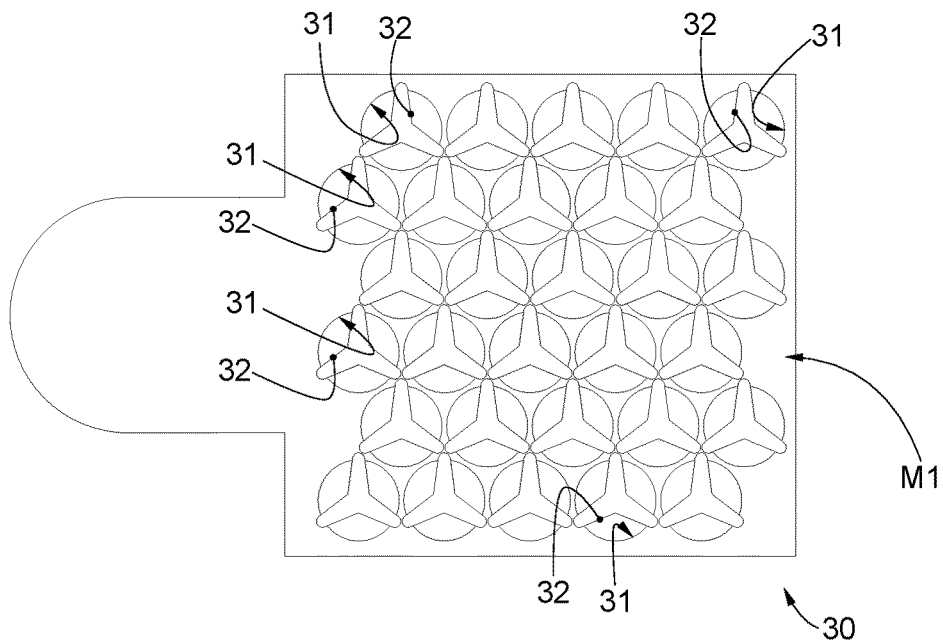
FIG. 13 is a top view of a support plate according to some embodiments described here.

In the embodiments in which there is also provided the weighing using the support plate 30 as a mean to make the containers C cooperate with the weighing means 33, each support seating 31 has, on the bottom surface, an aperture 32 shaped to allow the cooperation with the weighing means, also suitably shaped, FIGS. 13, 15 and 16. For example, the shaped aperture 32 can have a conformation in which three angled arms depart from a central zone, for example the arms being equally angled by about 120° with respect to each other, in particular being able to assume the shape of a three-pointed star.

In the event, on the other hand, that the weighing is not provided, according to some embodiments the support plate 30 can be without the shaped apertures 32, as for example in FIG. 12.

Figure 18:
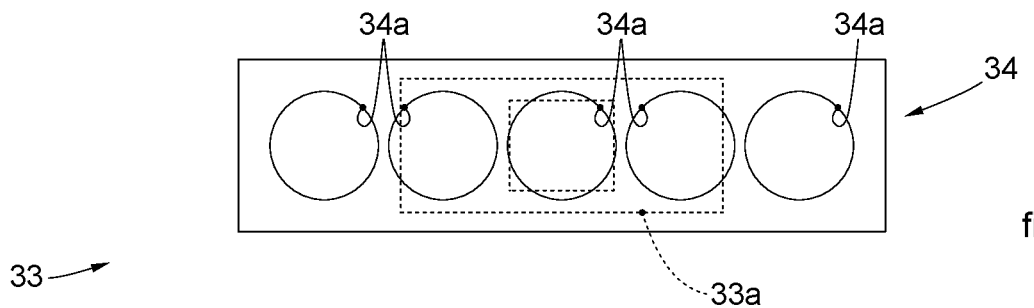
FIG. 18 is a schematic top plan view of weighing means according to some embodiments described here.
Figure 19:
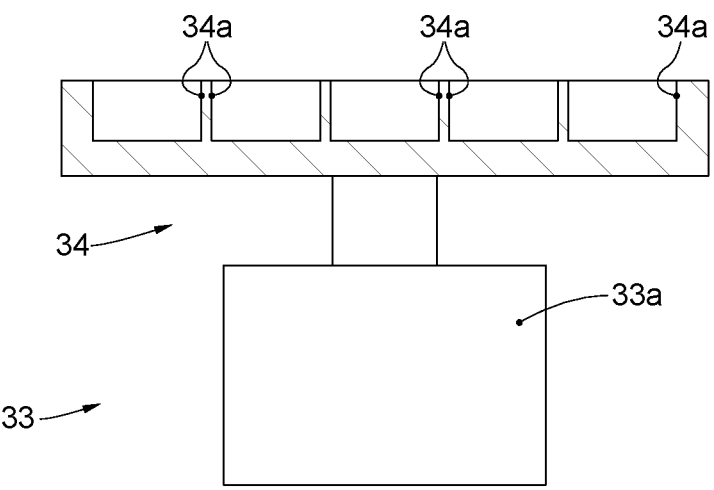
FIG. 19 is a partly sectioned schematic lateral view of weighing means according to some embodiments described here.

In some embodiments, which can be combined with all the embodiments described here, the weighing means 33 (FIGS. 14, 15, 16, 17, 18 and 19) comprise at least one scale 33a and at least one respective weighing plate 34 associated with the at least one scale 33a. The at least one scale 33a can comprise, for example, a load cell or other weight detector. A respective weighing plate 34 is mounted on the at least one scale 33a. At least one container C is positioned, on each occasion, on the weighing plate 34 in order to carry out the weighing, in particular positioned in a corresponding housing seating 34a of the weighing plate 34. To this end, the at least one weighing plate 34 can be shaped or conformed according to requirements, as better described below, for example with a single housing seating 34a, in order to weigh only one container C at a time (FIGS. 14, 15, 16 and 17), or a plurality of housing seatings 34a in order to weigh, therefore, a plurality of containers C supported by a same weighing plate 34 (FIGS. 18 and 19).

In some embodiments, described using FIGS. 14, 15, 16 and 17, the weighing means 33 comprise a plurality of scales 33a and a respective plurality of weighing plates 34, each operatively connected to a respective scale 33a. For example, the weighing plates 34 can be disposed to cooperate with one, two or more rows of containers C supplied by the support plate 30 for the purposes of the weighing, without being extracted from the respective support seatings 31 in which they are housed.

In these embodiments described using FIGS. 14, 15, 16 and 17, each scale 33a is used to weigh a single container C at a time, suitably positioned on the respective weighing plate 34. In particular, in these embodiments the weighing plate 34 is conformed having a single housing seating 34a able to receive one container C at a time.

Figure 14:
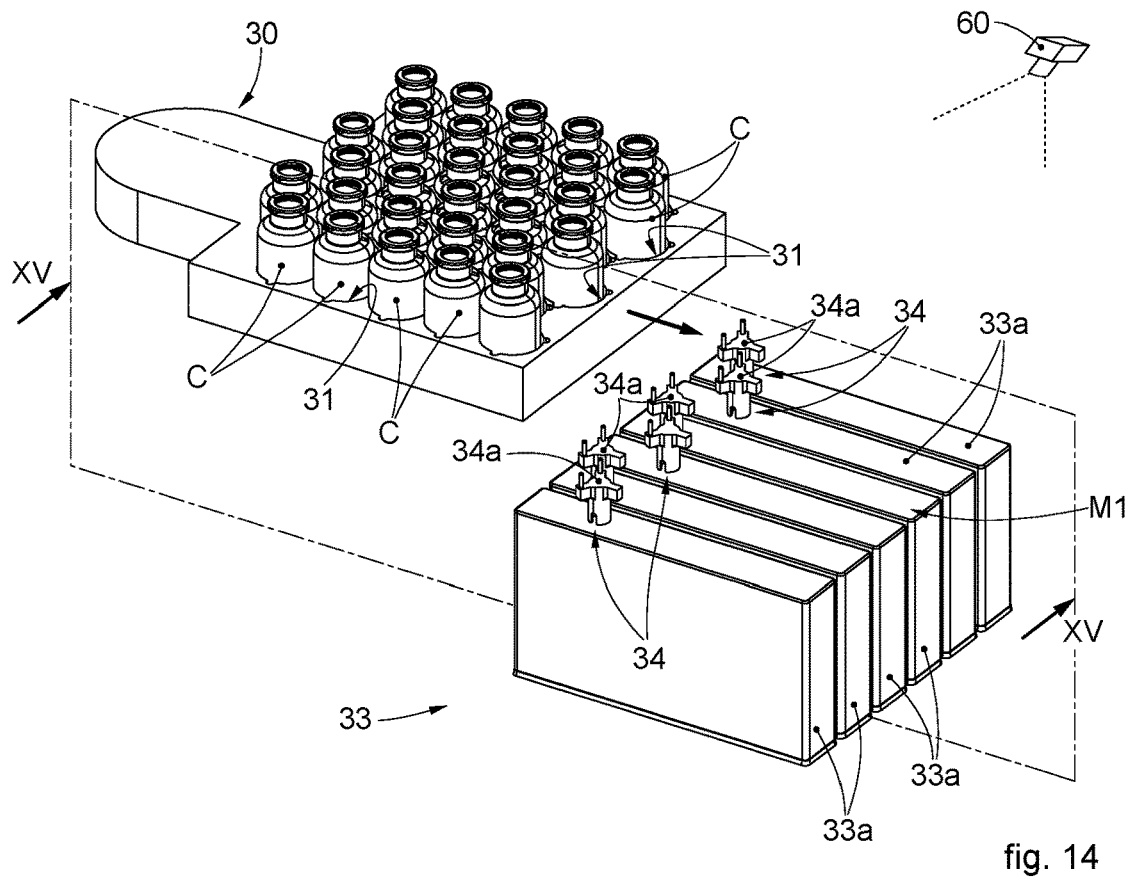
FIG. 14 is a perspective view of a support plate according to some embodiments described here, on which containers are positioned, in cooperation with weighing means of the processing line.

Furthermore, FIGS. 14, 15 and 16 show the embodiment in which the number of scales 33a, and therefore of respective weighing plates 34, is lower than the number of containers C provided on the support plate 30, or alternatively on the extraction gripper 22a, in particular disposed on two offset rows (for example in a "quincunx") in a manner coordinated with the offset disposition of two consecutive rows of the positioning matrix M1 defined by the support plate 31. However, it is not excluded that the weighing plates 34 are disposed aligned, or according to other spatial configurations.

Figure 17:
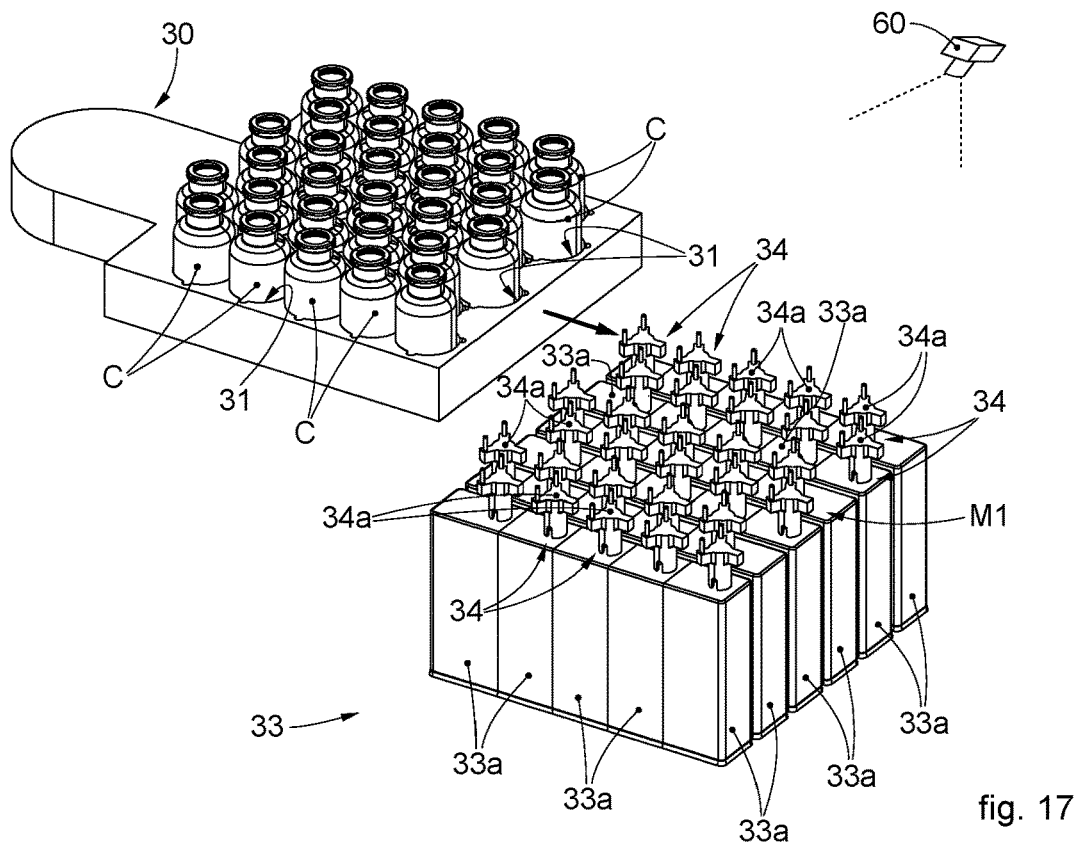
FIG. 17 is a perspective view of a support plate, on which containers are positioned, in cooperation with weighing means of the processing line according to other embodiments.

FIG. 17, on the other hand, shows the embodiment in which there are provided independent weighing plates 34 disposed, each on a respective scale 33a, according to the configuration defined by the positioning matrix M1, in which the number of scales 33a, and therefore of respective weighing plates 34, corresponds at least to the number of containers C present in two distinct rows, for example rows I and II, or more generally corresponding to a part or the totality of the number of containers C supported by the support plate 30 so that, in a single movement, they can all be weighed simultaneously and without being extracted from the respective support seatings 31 in which they are housed and manipulated individually or in rows.

In the embodiments described here, this applying both to what is described in relation to FIGS. 14-16 and also in relation to FIG. 17, the support plate 30 is configured to carry out at least a first movement of alignment with respect to the weighing means 33 so as to vertically align the shaped apertures 32 with the weighing plates 34 with respect to the positioning matrix M1, FIG. 15. In this case, each weighing plate 34 is advantageously shaped, presenting a conformation mating with that of the respective shaped aperture 32. Furthermore, the support plate 30 is configured to also perform a second movement so that the suitably shaped weighing plates 34 are inserted into the shaped apertures 32 and engage the containers C, FIG. 16, to then rise again so as to disengage the weighing plates 34 from the respective shaped apertures 32. In the case of the embodiments of FIGS. 14, 15 and 16, this sequence of movements is repeated, by making the support plate 30 progressively advance stepwise, coordinated with the distance between the rows of containers C and the weighing plates 34, with respect to the weighing means 33, so that all the containers C present on the support plate 30 are progressively located in cooperation with the rows of weighing plates 34, where they are weighed. On the other hand, in the case of the embodiments of FIG. 17, this sequence of movements is performed only once, since, thanks to the presence of a number of scales 33a and respective weighing plates 34 at least equal to the number of containers C, all containers C can be weighed simultaneously.

According to another possible embodiment, which can be combined with all the embodiments described here, the weighing plates 34 are mobile, and can be driven vertically to be inserted inside the shaped apertures 32 in order to engage the containers C. In this case, it can be provided that the support plate 30, after being aligned with the weighing plates 34, remains fixed, in a suitable position which allows it to interact with the weighing plates 34, at least during its stay in the filling and possible weighing station 12.

In the embodiments described here, in which it is provided to carry out an operation of weighing the tare, the present invention is particularly advantageous since, by moving a greater number of containers C at a time, it allows to reduce the number of times that the weighing of the tare of the containers C is performed.

In particular, in embodiments described using FIGS. 18 and 19 and which can be combined with all the embodiments described here, the weighing means 33 can include one or more scales 33a, each having a weighing plate 34 provided with a plurality of housing seatings 34a. Each of these housing seatings 34a is advantageously conformed to accommodate a respective container C, for the purpose of weighing the product that is introduced by the filling means 40. For example, the weighing means 33 can include a single scale 33a, which supports the weighing plate 34 with multiple housing seatings 34a, or they can include a plurality of such scales 33a, each equipped with a weighing plate 34 having multiple housing seatings 34a.

In the embodiments described using FIGS. 18 and 19, the number of housing seatings 34a for each weighing plate 34 is advantageously two or more, for example three, four, five, six or even more than six. These housing seatings 34a, based on their number and on operational requirements, can also be disposed on several consecutive rows, each row being able to provide in this case two or more housing seatings 34a, for example three, four, five, six or even more than six.

In the embodiments described using FIGS. 18 and 19, the housing seatings 34a are disposed aligned, however it is not excluded that the housing seatings 34a can also be disposed with a "quincunx" spatial configuration, or other configuration. Depending on the disposition of the housing seatings 34a provided in the weighing plate 34 described using FIGS. 18 and 19, the support plate 30 that carries the containers C, or the extraction gripper 22a if the support plate 30 is not used, is suitably moved with respect to the weighing means 33, in a manner similar to what described previously with reference to FIGS. 14, 15, 16 and 17, so that there is coordination and alignment between the containers C and the housing seatings 34a.

Advantageously, by means of the weighing means 33 according to the embodiments described using FIGS. 18 and 19, it is possible to significantly increase the productivity of the weighing procedure, particularly in the event that the weighing also involves a step of weighing the tare and, therefore, of the entire processing cycle.

In fact, by means of the weighing plate 34 provided with a plurality of housing seatings 34a, it is possible to accommodate a plurality of containers C supported by the weighing plate 34 associated with the respective scale 33a.

Figure 20:
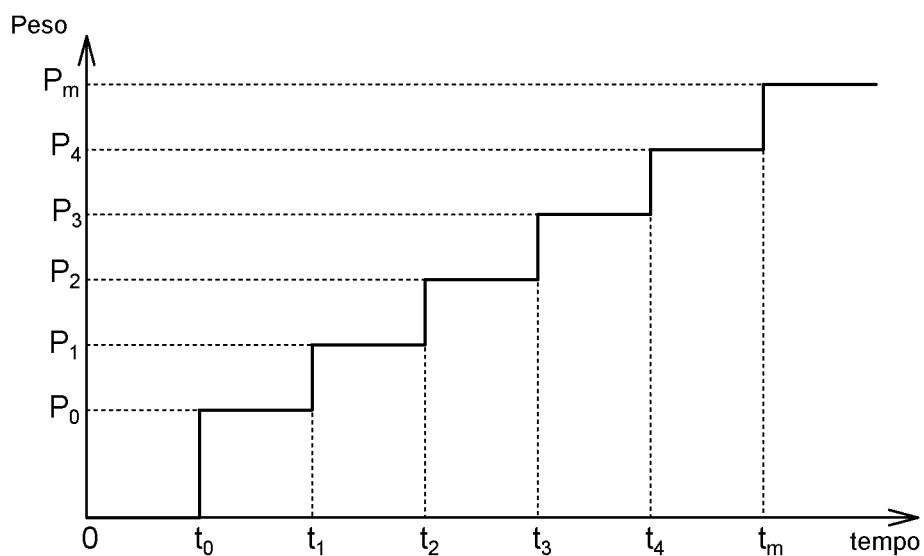
FIG. 20 is a graph that shows the trend over time (x axis) of the weight (y axis) detected by weighing means according to some embodiments described here.

With reference also to FIG. 20, which shows a graph of the trend over time (x axis) of the weight (y axis) progressively detected by the scale 33a, it is possible to see that at time t0, when all the containers C are positioned in their respective housing seatings 34a and are empty, that is, before the filling, the weight detected by the scale 33a at time t0 represents the weight of all the empty containers C, that is, the tare weight, or in any case of the reference value, or zero. This tare weight is the initial weight value with respect to which the subsequent operation of weighing the first container C which is filled by means of the filling means 40 refers. In the graph of FIG. 20 the tare weight is indicated by P0, at the instant of time t0.

Subsequently, at the time t1 a quantity of product is metered into one of the containers C and a weight P1 is detected, after which at time t2 a quantity of product is metered into another one of the containers C and a weight P2 is detected, and so on, repeating these weight measurements incrementally for a number "m" of times equal to the number of housing seatings 34a of each weighing plate 34, that is, equal to the number of containers C to be filled and weighed on a same scale 33a.

With the exception of the first weight detected, upstream of the start of the filling, which is the tare weight of all the "m" containers C present in the housing seatings 34a of each weighing plate 34 associated with a respective scale 33a, all the weights detected subsequently are gross weights. Therefore, for example, the net weight of the product metered into the first container C which is filled will be given by the difference between the gross weight P1 detected and the tare weight P0 detected initially, while the net weight of the product metered into the second container C which is filled will be given by the difference between the gross weight P2 detected and the previous gross weight P1, and so on. It is therefore possible to state that the gross weight detected in a given weighing operation, subsequent to the first operation of weighing the tare when the containers C are empty, in fact represents the reference weight with respect to which, in a subsequent operation of weighing the gross weight, the net weight of product metered in that given subsequent operation is calculated.

Therefore, in some embodiments, the progressive determination of the weight of product metered into a container C at a first filling step by means of the filling means 40 is carried out by means of the difference between the weight detected by the scale 33a at the first filling step and the tare weight of the containers C initially detected by the scale 33a and, subsequently, the progressive determination of the weight of product metered into a container C, at each specific filling step subsequent to the first by means of the filling means 40, is carried out by means of the difference between the weight detected at the specific filling step by the scale 33a and the weight detected by the scale 33a at the immediately preceding filling step.

In general, the net weight N(i+1) of product metered into a given container C at the instant of time i+1 by the filling means 40 will be defined by the difference between the current weight P(i+1) detected by the scale 33a and the weight P(i) detected by the same scale 33a in relation to the weighing immediately preceding the time i:

$$N(i+1)=P(i+1)-P(i)$$

where i is a natural number ranging from 0 to m and m is the number of containers C which are disposed and supported in the housing seatings 34a of the respective weighing plate 34 associated with a scale 33a.

As a consequence of what has been described above, therefore, the graph of FIG. 20 can therefore be considered a "step-shaped" graph of the weight with respect to time, where each step represents an increase in weight detected by the scale 33a and the entity of each step actually corresponds to the net weight of product metered in the specific filling step; it can therefore be stated that, in some embodiments, the weighing method described here is a "step-type" weighing method.

In some embodiments, therefore, the method provides to:
position, by means of the extraction means 22 or by means of the support plate 30 into which the containers C have been transferred by the extraction means 22, a plurality of empty containers C in the housing seatings 34a, so that each container C is inserted, preferably in a stable manner, in a specific housing seating 34a of the respective weighing plate 34;
carry out a weighing of the total tare, weighing all the containers C present in the respective housing seatings 34a of the weighing plate 34,
sequentially fill each of the containers C, progressively determining the weight of product metered into a specific container C by means of the scale 33a, at each step, that is, after each filling, without repeating the weighing of the tare for the given group of containers C to be filled and weighed, that is, without carrying out the weighing of the tare of each container C. This occurs without detaching the containers from the weighing plate 34, after having measured the total tare, in order to determine the weight of product metered into each container C by subtracting from the total weight determined on each occasion the value of the total weight determined in the last previous weighing.

If the weighing means 33 comprise a plurality of scales 33a, the steps of carrying out the weighing of the tare only once and of sequentially filling and weighing the containers C of each weighing plate 34 can advantageously occur in parallel for each of the scales 33a provided.

As indicated above, for the purposes of determining the weight of product metered into a specific container C by means of the scale 33a, after each filling step, the net weight N(i+1) of product metered by the filling means 40 in an instant of time i+1 is given by the difference between the weight P(i+1) detected in such instant of time i+1 and the weight P(i) detected in a previous instant of time i.

Consequently, the advantage obtained with the embodiments described using FIGS. 18 and 19 is evident, that is, the possibility to incrementally measure, for each of the containers C, the gross weight, and from here derive the net weight N since the tare weight is known, and having advantageously performed the weighing of the tare not individually for all the "m" containers C, but only once, at the beginning of the weighing cycle. Consequently, in these embodiments m−1 operations of weighing the tare and m−1 movements of the containers C are not required, with considerable advantages in terms of time, less wear, less energy consumption and less overheating of the automatic movement systems used.

Another advantage that is obtained with the embodiments described using FIGS. 18 and 19, with respect to the state of the art which provides that each scale is provided with its own weighing plate with a single positioning seating to receive a corresponding container to be filled and weighed, is that of achieving greater weighing accuracy. In fact, using a single scale to weigh a plurality of containers C by means of the respective weighing plate 34 prevents the adding up of multiple measurement errors, which could occur, on the other hand, if using multiple scales. It is thus also possible to reduce errors due to the setting of the accuracy threshold of the weighing of the tare for the various scales used. Furthermore, the embodiments of the method described using FIGS. 18 and 19 allow to have fewer measurement errors since fewer measurements are made, with the same number m of containers C to be weighed, and therefore the probability of error is lower. In particular, with the method described here, m+1 measurements are actually carried out for weighing m net weights, also taking into account the weighing of the initial tare, while with the method of the state of the art, 2*m measurements are carried out, implying the weighing of tare and gross weight for each of the m containers.

We also wish to point out that, in any case, using the support means, in this specific case the support plate 30, can be optional. In fact, in possible embodiments, the filling and possible weighing of the containers C can occur directly by using the extraction means 22, in particular the extraction gripper 22a, more particularly by moving the containers C held in position by the extraction gripper 22a in order to place them in cooperation with the filling means 40 and possibly with the weighing means 33.

In the embodiments described here which involve the use of weighing means 33 with a plurality of scales 33a, each having a respective weighing plate 34, conformed with a single housing seating (FIGS. 14, 15, 16, 17) or with multiple housing seatings 34a (FIGS. 18 and 19), the advantage of moving a plurality of containers C picked up from the container-holding tray 15 is evident, possibly even all those present therein, after suitable upending in the upending tray 20a, by means of the extraction means 22, advantageously provided with the extraction gripper 22a, and moved by means of the support plate 30 or the extraction means 22 themselves. This, in particular, in terms of a reduction in the number of movements of the containers C connected to the weighing operations and therefore an increase in the overall productivity of the processing line 10, lower energy consumption, less overheating and wear of the respective movement means.

In accordance with some embodiments, the processing line 10 can comprise, downstream of the filling and possible weighing station 12, other processing stations 14, such as for example a station for closing or capping the containers C, a labeling station, a packing station or other stations configured to perform other operations.

The other processing stations 14 can require the containers C to be supported in other support means suitable to allow the specific operations performed on the containers C in a determinate station.

For example, it can be provided to transfer the containers C from the support plate 30 to a subsequent processing station 14 by means of the reciprocal interaction between the support plate 30 and temporary extraction means 35 and, moreover, the subsequent delivery of the containers C from these temporary extraction means 35 to another support plate 36 associated with the processing station 14. As mentioned, instead of the support plate 30 it is alternatively possible to directly use the extraction means 22.

Figure 21:
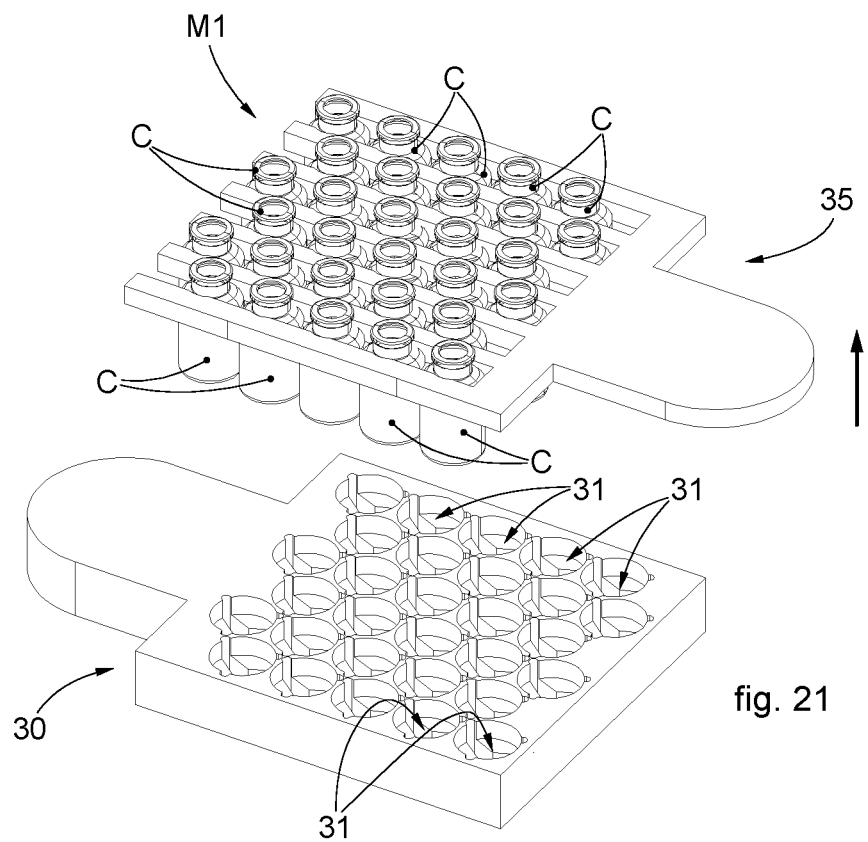
FIGS. 21-22 show an operation of transferring the containers from the support plate to another support plate of another processing station disposed downstream.
Figure 22:
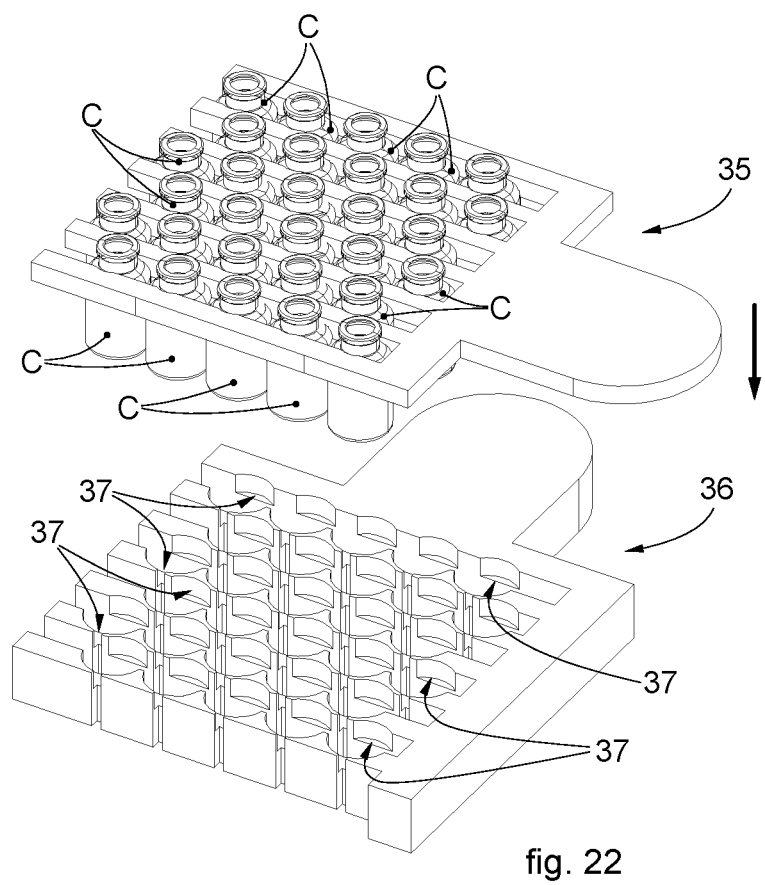

By way of example only, the processing line 10 can therefore provide the temporary extraction means 35 (see FIGS. 1, 21-22), having a conformation substantially similar to, or possibly the same as, that of the extraction means 22 described above, in particular the extraction gripper 22a. These temporary extraction means 35 can be conformed to cause the extraction of the containers C from the support plate 30, or from the extraction gripper 22a, keeping them suitably positioned, to then deliver them to the other support plate 36. The other support plate 36 can be provided with containing seatings 37 reciprocally disposed according to the configuration defined by the positioning matrix M1. The containing seatings 37 can have a perforated bottom, or not.

In accordance with possible embodiments, the processing line 10 also comprises a plurality of movement means 38, schematically shown in FIG. 1, disposed at least in correspondence with the processing stations 11, 12 in order to move in space at least the container-holding tray 15, the upending tray 20 and the extraction gripper 22, and possibly the other support plate 36 or alternatively the temporary extraction means 35.

The movement means 38 can be selected from a group comprising an automated movement device, a robotic movement device, magnetic movement devices or other known devices or a combination of these devices.

The filling and possible weighing station 12 can comprise, or be associated with, or remotely connected to, a command and control unit 50 (FIG. 1) configured to control and manage the functioning at least of the filling and possible weighing station 12.

For example, the command and control unit 50 can control and command the drive of the movement means 38, in particular in a manner concordant with a work cycle that is pre-set and/or selectable on each occasion, also as a function of the product to be metered and of the batch of containers C to be processed.

In accordance with some embodiments, there is also provided a method to move the containers C in the processing line 10. The method provides to:

supply a container-holding tray 15 containing a plurality of containers C disposed resting in an orderly manner, according to a pattern of lines and columns defined by the positioning matrix M1, on the container-holding tray 15 with their mouth 43 facing downward, that is, toward the bottom wall 17, so as to be, for example, resting on the container-holding tray 15, upend the containers C by means of the upending tray 20a which engages in an orderly manner, according to the pattern of lines and columns defined by the positioning matrix M1, at least part, or all, of the containers C disposed in the container-holding tray 15, the upended containers C being supported at the bottom by the upending tray 20a; the cooperation between the upending tray 20a and the container-holding tray 15 allows to invert the orientation of the containers C so that, at the end of the upending, the containers C are supported at the bottom by the upending tray 20a with the side of the mouth 43 facing upward.

In accordance with one aspect of the present invention, the method also provides to move, with respect to the upending tray 20a, the extraction means 22 in the pick-up direction W and, by moving these extraction means 22, to pick up, from the upending tray 20*a*, at least two containers C disposed on two parallel and consecutive rows I, II of the positioning matrix M1.

Of these containers C, a first container C is positioned in a first row I and a second container C is positioned in a second row II, wherein the first row I is more external, in the positioning matrix M1, with respect to the second row II, with reference to the pick-up direction W.

Picking up and moving such a group of containers C, comprising at least the first container C and the second container C of the two parallel and consecutive rows as defined above, allows to speed up the movement and, in general, to reduce the displacements of the containers C between the processing stations, movement times, number of movements, reduce wear, overheating and energy consumption of the movement members and increase the overall productivity of the processing line 10. In fact, in this way a smaller number of movements can be sufficient to pick up, on each occasion, all the containers C disposed in the container-holding tray 15.

Figure 5:
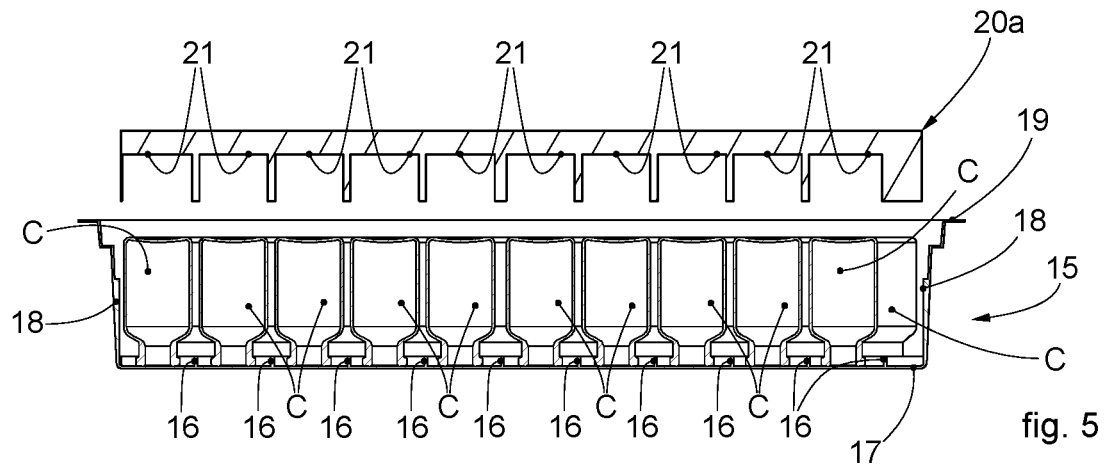
FIGS. 5-8 are lateral section views of a sequence of operational steps performed inside the storage and pick-up station.
Figure 6:
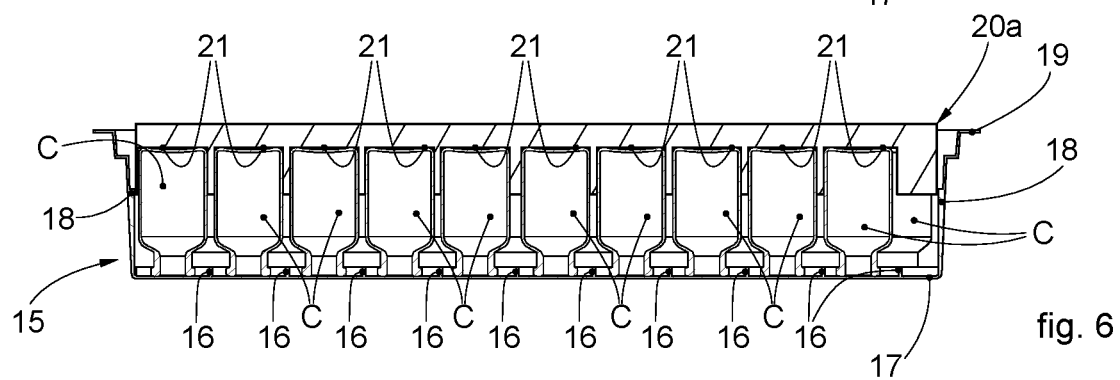
Figure 7:
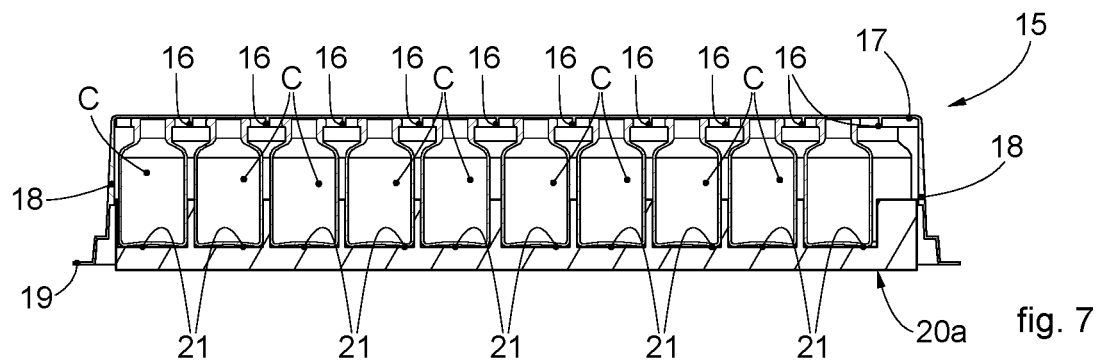

The upending tray 20*a* and the container-holding tray 15 can be held and moved by respective gripping and movement means 38 which are able to move in space the upending tray 20*a* and the container-holding tray 15 according to an operating sequence that, for example, provides to:

couple the upending tray 20*a*, disposed with the upending seatings 21 facing downward, with the container-holding tray 15 so that the support seatings 16 of the container-holding tray 15, inside which the containers C are disposed upside down, are aligned with the upending seatings 21 of the upending tray 20*a*, FIG. 5, move the upending tray 20*a* and the container-holding tray 15 in a relative manner, coupling them, for example along a linear directrix, so that the containers C are resting, on the side of the mouth 43, on the support seatings 16 and are abutted, in correspondence with an opposite bottom end 45 of the containing body 42, by the upending seatings 21, FIG. 6, rotate the upending plate 20 and container-holding tray 15 assembly so that the containers C are resting on the upending seatings 21 of the upending tray 20*a* with respect to the bottom end 45 of the containing body 42, and are abutted in correspondence with their mouth 43 by the support seatings 16 of the container-holding tray 15, FIG. 7, move the upending tray 20*a* and the container-holding tray 15 in a relative manner, uncoupling them, for example along a linear directrix, so that the containers C are resting on the upending seatings 21 of the upending tray 20*a* and are available to be picked up by the extraction gripped 22*a*.

Figure 8:
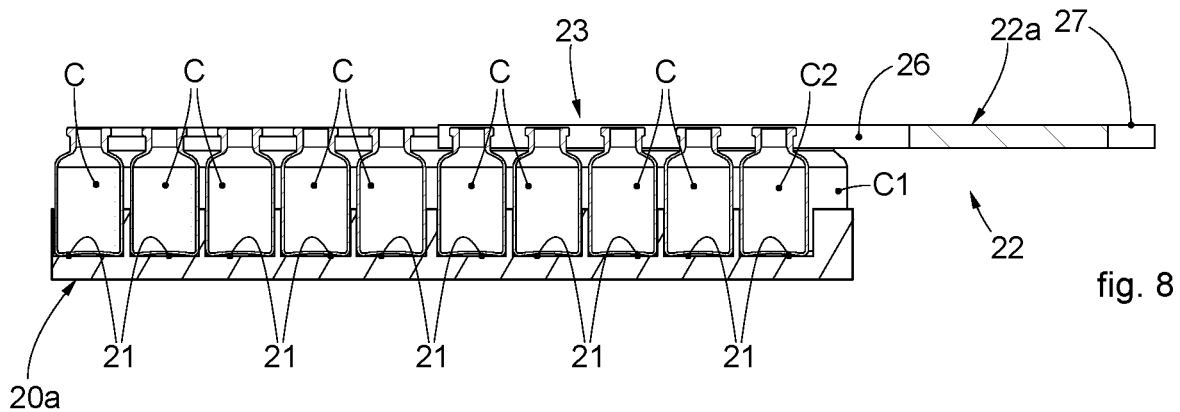

The extraction gripper 22*a* therefore carries out at least a first relative movement of engagement (pick-up direction W, FIGS. 4 and 9) with respect to the upending tray 20*a* in order to engage the at least one part of the group of containers C disposed in the upending seatings 21 of the upending tray 20*a*, holding the containers C engaged in the gripping inlets 24, FIG. 8. It is also possible that, alternatively, the upending tray 20*a* is moved in accordance with the first relative movement of engagement with respect to the extraction gripper 22*a*.

Once the containers C are engaged, a second relative movement can be carried out, for example transverse, and in particular orthogonal, to the pick-up direction W, between the extraction gripper 22*a* and the upending tray 20*a* in order to extract the containers C from the latter. In possible implementations, for example, the extraction gripper 22*a* can also carry out at least a second relative movement of lifting, transverse, and in particular orthogonal, to the pick-up direction W, with respect to the upending tray 20*a* so as to extract from the upending tray 20*a* the containers C held in the gripping inlets 24, in order to move them to the next processing station, FIG. 10. Or, alternatively, the extraction gripper 22 can be kept stationary and the upending tray 20*a* can be moved, in particular with a movement of descent transverse, and in particular orthogonal, to the pick-up direction W.

Subsequently, the method provides to move the containers C toward the filling and possible weighing station 12, in particular toward the support plate 30, if provided, in order to deposit the containers C in the respective support seatings 31 of the support plate 30, FIG. 11. Then, the filling (FIG. 12), or the filling and weighing (FIGS. 14-17) can be carried out, for example using the support plate 30 most suited to the purpose, if provided (FIG. 12 or FIG. 13). The support plate 30 is, in any case, conformed in such a way as to allow the filling and possible weighing of the containers C without these being extracted and/or removed from the support plate 30 itself, with an evident advantage in terms of operating time and with a lower number of movements. As already described above, as an alternative to the support plate 30, it is possible to directly use the extraction gripper 22*a*.

If the weighing is carried out, possibly before (tare weighing) and after the filling (see FIGS. 14-17 and 18-19), the support plate 30, if provided, is moved toward the weighing means 33, otherwise the extraction gripper 22*a* can be used directly.

In the embodiments described using FIGS. 14-17, one or more rows of containers C present in the support plate 30 are aligned with respective scales 33*a* of the weighing means 33 so that the shaped apertures 32, in correspondence with one or more given rows of containers C to be weighed, are aligned with respective weighing plates 34. The latter are shaped to pass through the shaped apertures 32 and cooperate with the containers C to determine the weight of the containers C or the weight of the product contained therein after the filling carried out by means of suitable filling means 40, FIG. 16.

When one or more rows of containers C present in the support plate 30 are vertically aligned with respective weighing plates 34, the support plate 30 and the weighing plates 34 carry out a movement that brings them close to each other so that the weighing plates 34 are inserted into the respective shaped apertures 32 of the support plate 30 (FIG. 16) in order to carry out the weighing operation, and a subsequent movement that takes them away from each other so that the weighing plates 34 are released from the respective shaped apertures 32 of the support plate 30. In a preferred solution, shown in FIGS. 15-16, the support plate 30 is mobile while the weighing plates 34 are fixed; the support plate 30 moves toward the weighing plates 34 so that the weighing plates 34 are inserted into the respective shaped apertures 32 of the support plate 30 in order to carry out the weighing operation, and moves away from the weighing plates 34 so as to extract the weighing plates 34 from the respective shaped apertures 32 of the support plate 30. However, we do not exclude embodiments in which, on the other hand, the weighing plates 34 are vertically mobile to engage the containers C through the shaped apertures 32. In any case, in the embodiments described in which the support plate 30 is used for weighing purposes, the containers C can be partly or completely released from the support plate 30. In the case of complete release, we mean that the lower plane of each container C ends on the upper plane of the support plate 30.

As indicated above, in other embodiments, instead of the support plate 30, the extraction means 22, in particular the extraction gripper 22a, move the containers C toward the at least filling station 12 to cooperate with the filling means 40 provided in the at least filling station 12, providing to vertically align the rows of containers C present in the extraction gripper 22a with the filling means 40. If the at least filling station 12 is also a filling and weighing station, the extraction gripper 22a is moved also toward the weighing means 33 associated with the filling and weighing station. In this case, it is provided to vertically align the rows of containers C present in the extraction gripper 22a with respective weighing means 33 so as to align the containers C with corresponding shaped weighing plates 34 of the weighing means 33.

In the embodiments described using FIGS. 18 and 19, on the other hand, the support plate 30, or alternatively the extraction means, in particular the extraction gripper 22a, move a group of containers C to be filled and weighed with respect to the weighing means 33 provided with the weighing plate 34 which has the multiple housing seatings 34a. In this case, a number of containers C, disposed for example along one row and advantageously equal to the number of housing seatings 34a, are positioned there, after which a single weighing operation is carried out in order to measure the total tare, weighing all the containers C present in the housing seatings 34a of the weighing plate 34. Subsequently, by means of the filling means 40, the product is progressively metered into each of the containers C, measuring the weight on each occasion, as described above with reference to FIG. 20. The above operations of positioning a group of containers C in the housing seatings 34a, initial weighing of the tare, progressive filling of each container C of the given group and corresponding weighing of the gross weight in order to calculate, by difference, the net weight of product metered into the specific filled container C are repeated as many times as the rows of containers C to be weighed, or a submultiple of the number of rows of containers C to be weighed, also based on the number and disposition of the housing seatings 34a provided on the weighing plate 34 described with reference to FIGS. 18 and 19.

Furthermore, we wish to point out that in the embodiments in which, instead of the support plate 30, the extraction means 22, in particular the extraction gripper 22a, are used directly to move the containers C, it is preferable that, for the purposes of the weighing by means of the weighing means 33, the containers C be suitably released from the extraction gripper 22a so as not to distort the weight or transmit vibrations during the weighing step itself.

At the end of the filling and possible weighing operation, it can be provided to transfer the containers C, filled and possibly weighed, from the support plate 30, or from the extraction gripper 22a, to a subsequent processing station 14. In this way, the support plate 30, or the extraction gripper 22a, without containers C, can return to the previous filling and possible weighing station 12 to receive other containers C to be filled and possibly weighed. The transfer to the subsequent processing station 14 can be achieved through the reciprocal interaction between the support plate 30, or the extraction gripper 22a, and the temporary extraction means 35, FIG. 21; and the subsequent delivery of the containers C to the other support plate 36, FIG. 22, associated with the processing station 14. Support plate 30, or alternatively extraction gripper 22a, temporary extraction means 35 and other support plate 36 can be moved in a relative manner with respect to each other. For example, the temporary extraction means 35 can be fixed and the support plate 30, or the extraction gripper 22a, can be moved by suitable automated movement means in order to engage the temporary extraction means 35 and thus determine the transfer of the containers C to the latter. At this point, once the support plate 30, or the extraction gripper 22a, has moved away in order to return to the previous filling and possible weighing station 12, in a similar manner the other support plate 36 can be moved, by suitable automated movement means, in order to in turn engage the temporary extraction means 35 which temporarily support the containers C, and thus determine the transfer of the containers C to the other support plate 36.

In accordance with possible embodiments, according to the method described, it is provided to move at least the container-holding tray 15, the upending tray 20a, the extraction gripper 22a, possibly the support plate 30 and possibly the other support plate 36, or alternatively the temporary extraction means 35, by means of robotic automated movement means, for example anthropomorphic.

Furthermore, according to other embodiments, the weighing method described here can comprise a step of checking or inspecting, by means of optical acquisition means, in particular of images or videos, in order to check for the presence or absence of containers C and/or the correct number of containers C and/or the correct position of the containers C.

For this purpose, at least one suitable optical inspection assembly 60 can be provided (FIGS. 1, 4, 11, 12, 14, 15, 16, 17) associated with the filling and possible weighing station 12, and possibly also with the storage and pick-up station 11, for example comprising a video camera or similar optical or video inspection mean. The optical inspection assembly 60 can be advantageously connected to the command and control unit 50, to which it supplies acquisition signals that are processed to provide feedback on the check carried out; optionally, the command and control unit 50, as a function of the outcome of the check, can supply a signal or warning to an operator, whether an automated, robotized or human operator, to possibly intervene and solve a problem, for example of a possible lack of containers C or incorrect positioning.

The optical inspection assembly 60 can be suitably positioned over a zone of interest to be inspected where there is a group of containers C to be transported, filled and possibly weighed, so that a visual area of the optical inspection assembly 60 can inspect this group of containers C.

In particular, this checking or inspecting step can be carried out in relation to the containers C picked up by the extraction means (FIG. 4), or to verify the correct transfer of containers C from the extraction means 22 to the support plate 30 (FIG. 11) or also in relation to the disposition of the containers C on the weighing plates 34 (FIGS. 14, 15, 16, 17).

For example, according to one possible implementation, this checking step by means of the optical inspection assembly 60 can be carried out when the extraction means 22 pick up a group of containers C from the upending tray 20a (see FIG. 4). In this case, the checking or inspecting step can be advantageously aimed at verifying whether or not the extraction means 22 have picked up all the containers C.

Figure 11:
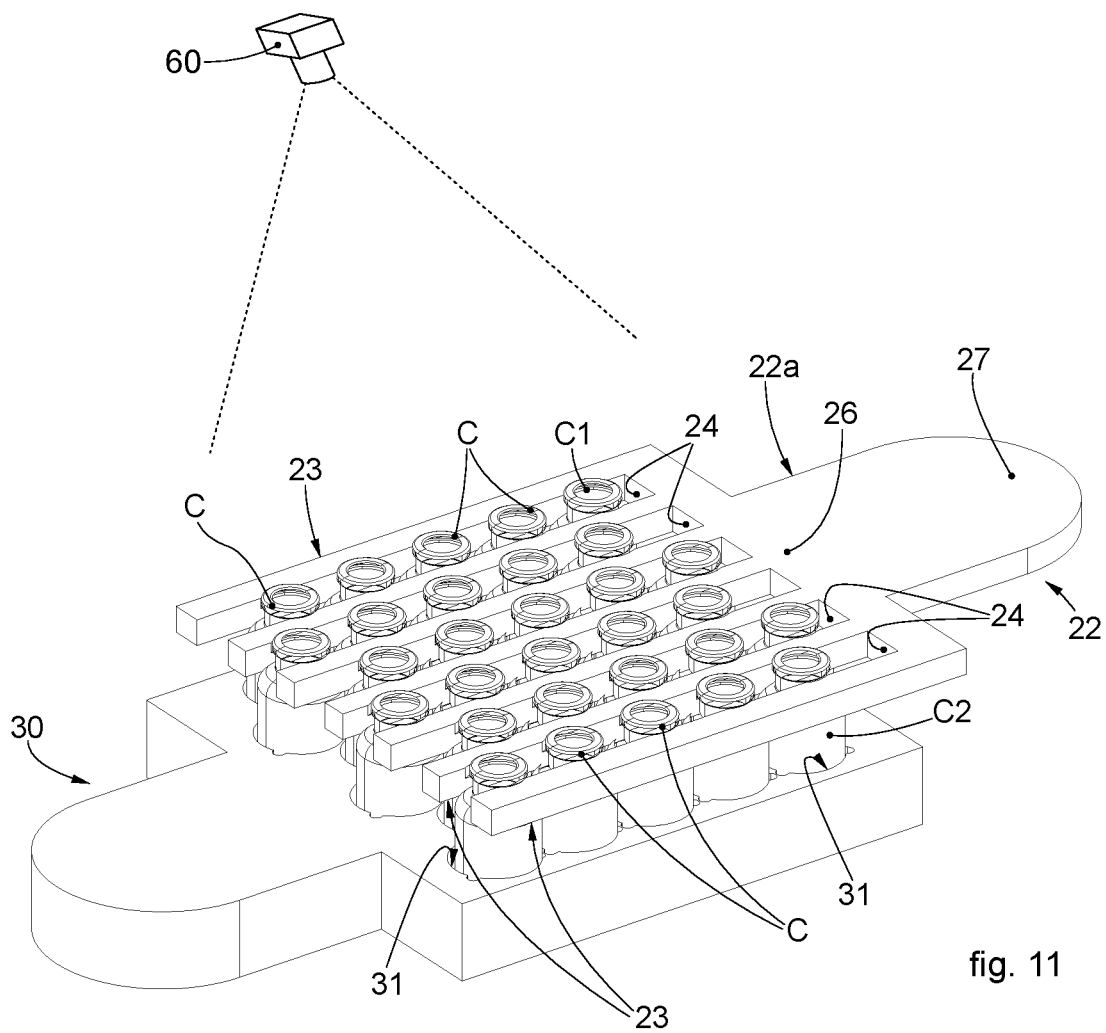
FIG. 11 is a perspective view of a support plate according to some embodiments described here on which containers are positioned, in cooperation with extraction means of the processing line.

According to another example, which can be combined with the other examples described here, the checking or inspecting step can be carried out if the containers C are transferred by the extraction means 22 to the support plate 30, also in this case for example to verify the presence of all the containers C (see FIG. 11).

In accordance with yet another example, which can also be combined with the other examples described here, the checking or inspecting step can be carried out when the extraction means 22, or the support plate 30, position the containers C on a respective weighing plate 34 of the weighing means 33, in order to check that all the containers C are disposed in the respective positioning seatings 34*a* (see FIGS. 14, 15, 16, 17). In this case, therefore, it is advantageously possible to check the presence of containers C on the respective positioning seatings 34*a*, in order to verify that no containers C are missing with respect to those picked up. Possibly, in this case, it is also possible to verify the correct positioning of the containers C with respect to the positioning seatings 34*a*, to prevent them from being in an unfavorable position for the weighing and/or filling.

It is clear that modifications and/or additions of steps and/or parts may be made to the method to move containers in a processing line and to the respective processing line as described heretofore, without departing from the field and scope of the present invention as defined by the claims.

It is also clear that, although the present invention has been described with reference to some specific examples, a person of skill in the art shall certainly be able to achieve many other equivalent forms of a method to move containers in a processing line and respective processing line, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Method to move containers in a processing line that comprises a station for storing and picking up said containers and a station at least for filling said containers, said method providing, in said storage and pick-up station, to:
supply a container-holding tray containing a plurality of said containers disposed resting in an orderly manner, according to a pattern defined by a positioning matrix, on said container-holding tray with their mouth facing toward a bottom wall of said container-holding tray,
upend said containers disposed in said container-holding tray with an upending tray configured to couple with said container-holding tray so as to engage, according to said pattern defined by said positioning matrix, at least one part of said containers, said upended containers being supported at the bottom by said upending tray,
said method being characterized in that it also provides to move, with respect to said upending tray, an extractor to pick up, from said upending tray, at least two containers disposed in two parallel and consecutive rows of said positioning matrix, of which a first container said at least two containers is positioned in a first row (I) and a second container of said at least two containers is positioned in a second row (II), wherein said extractor is moved in a pick-up direction on a substantially horizontal plane, so that the extractor first encounters the first container to be picked up and then the second container to be picked up, which is therefore further downstream, when said extractor moves toward the container-holding tray in the pick-up direction, and subsequently to move said at least two containers picked up with said extractor toward said filling station;
wherein said extractor moves the containers toward said filling station in order to cooperate with a filler provided in said filling station, providing to vertically align the rows of containers present in said extractor with said filler; and
wherein said filling station is a filling and weighing station and said extractor is also moved toward a scale associated with said filling and weighing station, said method providing to vertically align the rows of containers present in said extractor with respective scale so as to align said containers with corresponding weighing plates of said scale.

2. Method as in claim 1, characterized in that said method provides to carry out at least a first relative movement of engagement of said extractor with respect to said upending tray on a substantially horizontal plane, in order to engage and hold, in said extractor, said group of containers present in said upending tray, wherein said method also provides a second relative movement of said extractor with respect to the upending tray so as to extract, from the upending tray, the containers held in the extractor, in order to move them toward the filling station.

3. Method as in claim 1, characterized in that said extractor move the containers toward said filling station in cooperation with which a support plate is provided, provided with a plurality of support seatings into which the extractor deposits the containers.

4. Method as in claim 3, characterized in that the support plate that carries said containers is moved toward the filler provided in said filling station, providing to vertically align the rows of containers present in said support plate with said filler.

5. Method as in claim 4, characterized in that said filling station is a filling and weighing station and the support plate is also moved toward the scale associated with said filling and weighing station, said method providing to vertically align the rows of containers present in said support plate with said scale so as to align respective shaped apertures made in each support seating of said support plate with corresponding weighing plates of said scale which pass through said shaped apertures and cooperate with the containers.

6. Method as in claim 5, characterized in that when the rows of containers present in said support plate are vertically aligned with respective of said scale, the support plate and the weighing plates perform a movement that brings them closer to each other so that the weighing plates are inserted in the respective shaped apertures of the support plate in order to carry out the weighing operation, and a subsequent movement that distances them from each other so that the weighing plates are released from the respective shaped apertures of the support plate.

7. Method as in one of claim 1, characterized in that said at filling station is a filling and weighing station which includes said scale which supports a weighing plate provided with a plurality of housing seatings, each configured to receive and support a corresponding container.

8. Method as in claim 7, characterized in that said method comprises positioning, with said extractor or with a support plate into which said containers have been transferred by said extractor, said containers in said housing seatings, weighing the total tare, weighing all the containers present in the housing seatings said weighing plate and sequentially filling each of said containers, progressively determining the weight of product metered into a specific container by use of said scale after each filling step, without detaching the containers from the weighing plate after having measured the total tare, in order to determine the weight of the product metered into each container by subtracting, from the total weight determined on each occasion, the value of the total weight determined in the last previous weighing step.

9. Method as in claim 1, characterized in that it provides to move at least the container-holding tray, the upending tray, the extractor by use of automated or robotic gripping and movement means.

10. Line to process containers comprising a station for storing and picking up said containers and a station at least for filling said containers, said storage and pick-up station being provided with a container-holding tray on which a plurality of containers are able to be pre-positioned, according to a pattern defined by a positioning matrix and with the side of the mouth facing toward a bottom wall of said container-holding tray, and an upending tray configured to upend at least part of said containers disposed in said container-holding tray, keeping them supported at the bottom by said upending tray according to said pattern defined by said positioning matrix, said processing line being characterized in that it comprises an extractor configured reciprocally mobile with respect to said upending tray in a pick-up direction that lies on a substantially horizontal plane, wherein said extractor is conformed to pick up, from said upending tray, at least two containers disposed on two parallel and consecutive rows of said positioning matrix, of which a first container of said at least two containers is positioned in a first row and a second container of said at least two containers is positioned in a second row, wherein said first row is upstream of said second row, with respect to a movement toward the container-holding tray in said pick-up direction, and to move said at least two containers toward said filling station after they have been picked up by said extractor;

wherein said filling station is a filling and weighing station which includes a scale which supports a weighing plate provided with a plurality of housing seatings each configured to receive and support a corresponding container.

11. Processing line as in claim 10, characterized in that said extractor comprises an extraction gripper provided with a plurality of inter-spaced arms, parallel to each other and defining gripping inlets, each of said arms comprising an array of holding seatings shaped to support respective containers, each holding seating comprising respective support portions, facing each other from opposite sides of a same gripping inlet, and being made hollow on respective arms in order to receive, resting on them, a respective container in correspondence with a neck portion of said container.

12. Method to move containers in a processing line that comprises a station for storing and picking up said containers and a station at least for filling said containers, said method providing, in said storage and pick-up station, to:

supply a container-holding tray containing a plurality of said containers disposed resting in an orderly manner, according to a pattern defined by a positioning matrix, on said container-holding tray with their mouth facing toward a bottom wall of said container-holding tray, upend said containers disposed in said container-holding tray with an upending tray configured to couple with said container-holding tray so as to engage, according to said pattern defined by said positioning matrix, at least one part of said containers, said upended containers being supported at the bottom by said upending tray, said method being characterized in that it also provides to move, with respect to said upending tray, an extractor to pick up, from said upending tray, at least two containers disposed in two parallel and consecutive rows of said positioning matrix, of which a first container said at least two containers is positioned in a first row (I) and a second container of said at least two containers is positioned in a second row (II), wherein said extractor is moved in a pick-up direction on a substantially horizontal plane, so that the extractor first encounters the first container to be picked up and then the second container to be picked up, which is therefore further downstream, when said extractor moves toward the container-holding tray in the pick-up direction, and subsequently to move said at least two containers picked up with said extractor toward said filling station;

wherein said extractor comprises an extraction gripper provided with a plurality of inter-spaced arms, parallel to each other and defining gripping inlets, each of said arms comprising an array of holding seatings shaped to support respective containers, each holding seating comprising respective support portions, facing each other from opposite sides of a same gripping inlet, and being made hollow on respective arms to receive, resting on them, a respective container in correspondence with a neck portion of said container.

\* \* \* \* \*